United States Patent
Wang et al.

(10) Patent No.: US 11,290,736 B1
(45) Date of Patent: Mar. 29, 2022

(54) TECHNIQUES FOR DECODING OR CODING IMAGES BASED ON MULTIPLE INTRA-PREDICTION MODES

(71) Applicant: Lemon Inc., Grand Cayman (KY)

(72) Inventors: Yang Wang, Beijing (CN); Kai Zhang, Los Angeles, CA (US); Li Zhang, Los Angeles, CA (US); Yuwen He, Los Angeles, CA (US); Hongbin Liu, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/148,356

(22) Filed: Jan. 13, 2021

(51) Int. Cl.
  *H04N 19/50* (2014.01)
  *H04N 19/70* (2014.01)
(52) U.S. Cl.
  CPC ............. *H04N 19/50* (2014.11); *H04N 19/70* (2014.11)
(58) Field of Classification Search
  None
  See application file for complete search history.

(56) References Cited

U.S. PATENT DOCUMENTS

| | | | |
|---|---|---|---|
| 2009/0180538 A1* | 7/2009 | Visharam | H04N 19/147 375/240.15 |
| 2010/0246675 A1* | 9/2010 | Gharavi-Alkhansari | ................... H04N 19/134 375/240.13 |

OTHER PUBLICATIONS

Lainema et al., "Intra Coding of the HEVC Standar," IEEE Transactions on Circuits and Systems for Video Technology, vol. 22, No. 12, Dec. 2012, pp. 1792-1801. (Year: 2012).*

\* cited by examiner

*Primary Examiner* — Christopher Braniff
(74) *Attorney, Agent, or Firm* — Arent Fox LLP

(57) ABSTRACT

Aspects include a method, apparatus and computer-readable medium of decoding video or blocks of an image, including receiving a bitstream of the image, deriving, for a block of the image in the bitstream, multiple intra-prediction modes (IPMs) to use in decoding the block, determining, based on the multiple IPMs, a final predictor to use in decoding the block, and decoding the block using the final predictor. Other aspects include method, apparatus and computer-readable medium for similarly encoding video or blocks of an image.

19 Claims, 38 Drawing Sheets

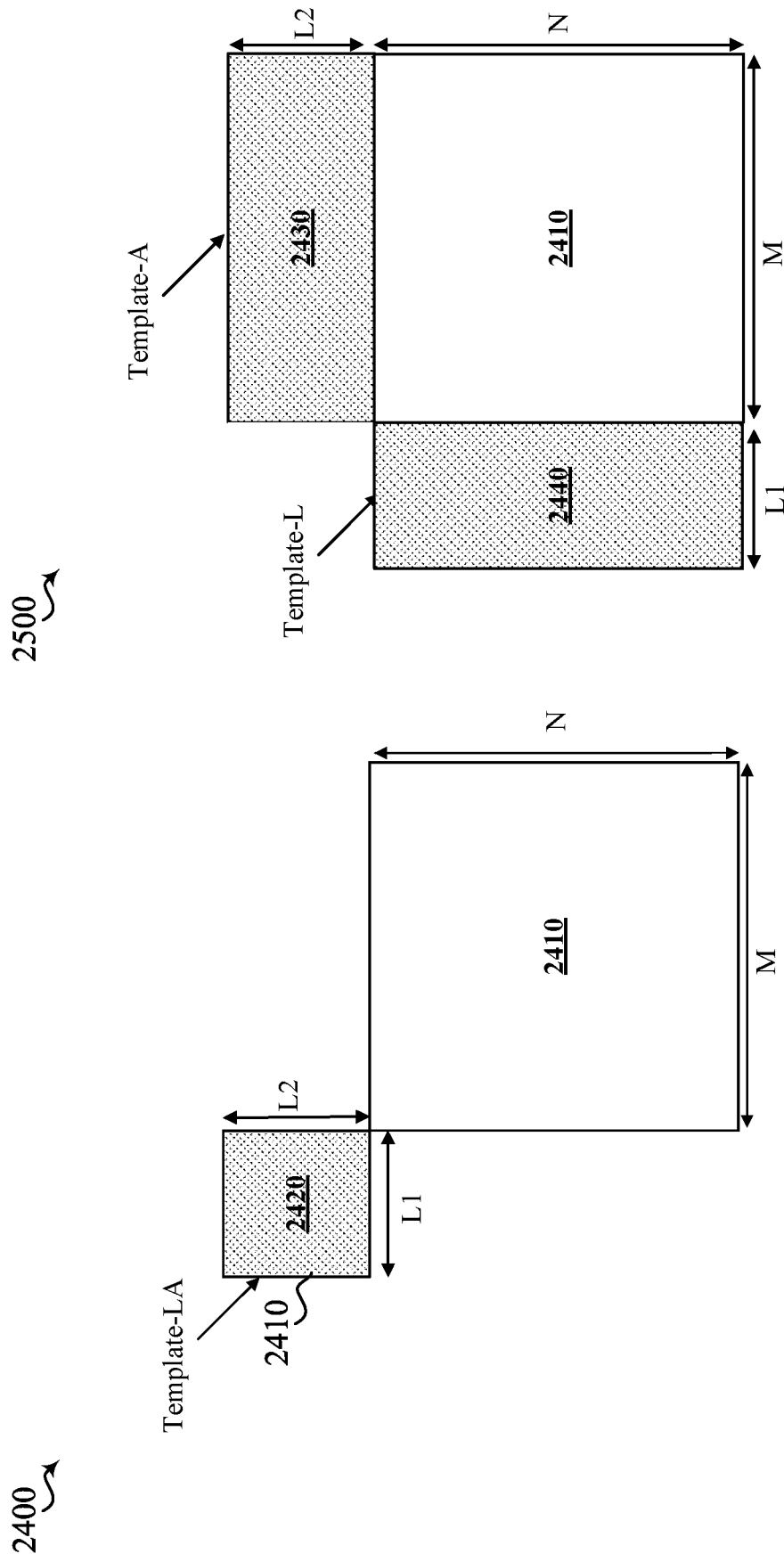

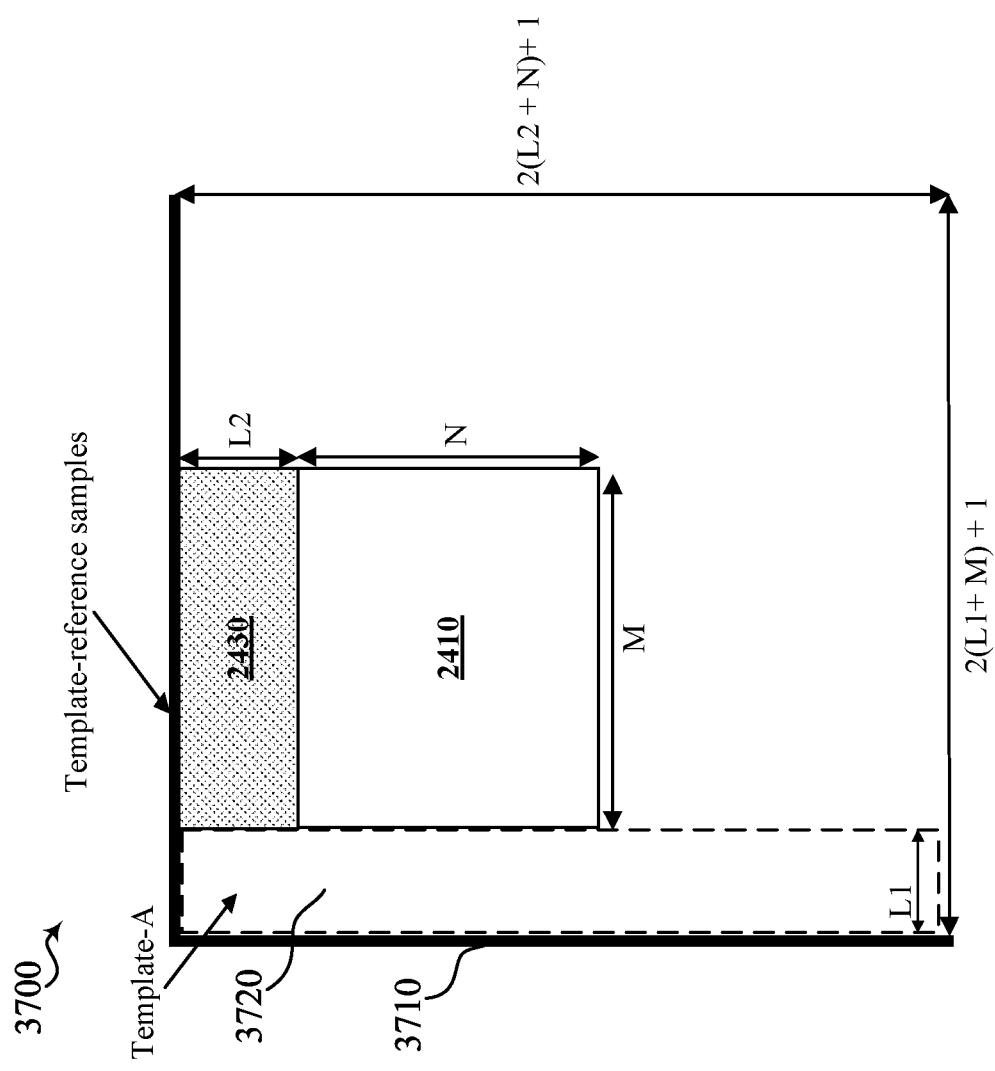

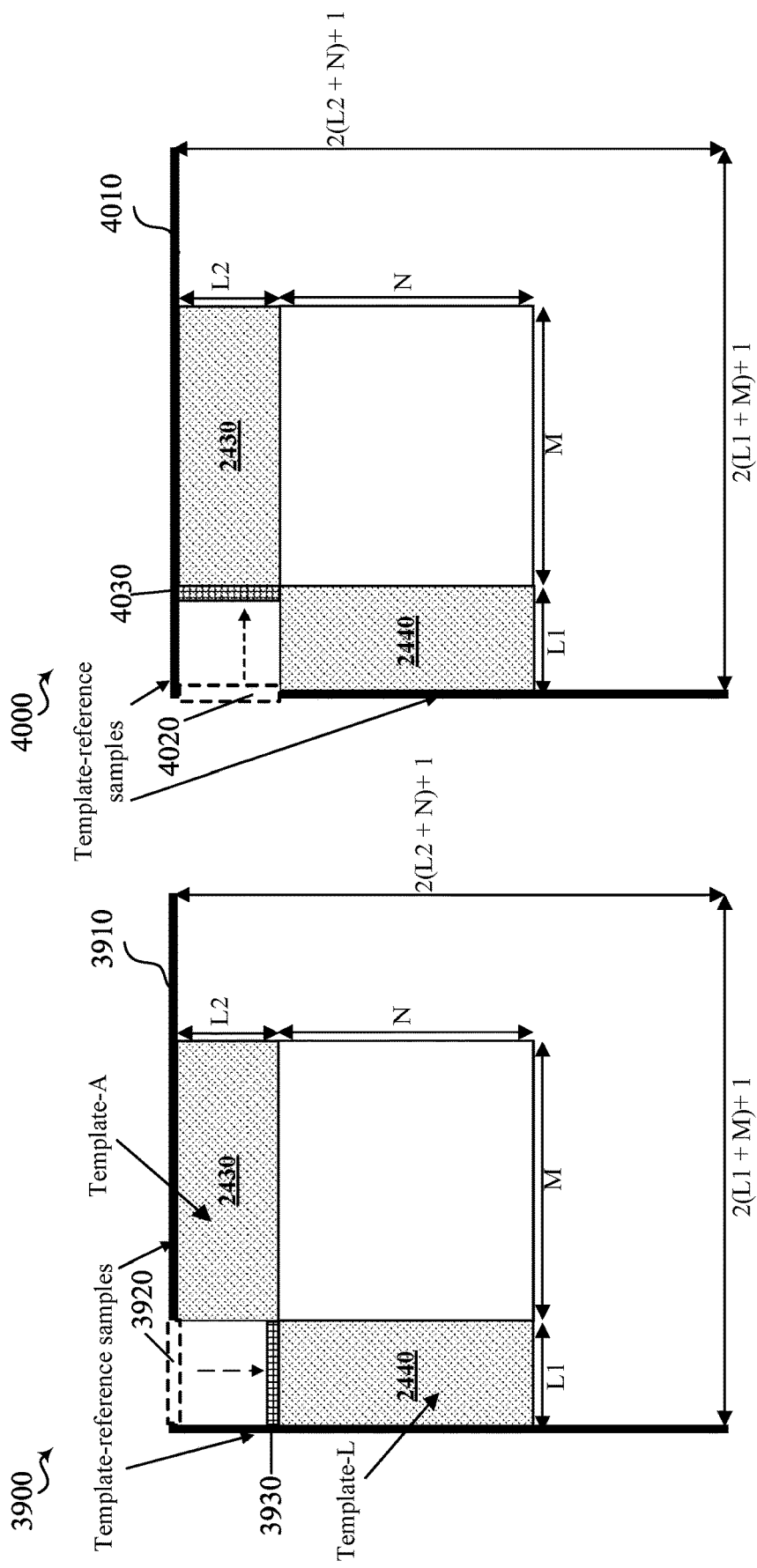

TECHNIQUES FOR DECODING OR CODING IMAGES BASED ON MULTIPLE INTRA-PREDICTION MODES

BACKGROUND

The present disclosure relates generally to video coding, and more particularly, to video encoding and decoding based on an intra-prediction mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method for processing video data is provided. The method includes constructing, during a conversion between a current video block of a video and a bitstream of the video, at least one template set for the current video block from a plurality of sub-templates, deriving multiple intra-prediction modes (IPMs) based on cost calculations, determining, based on the multiple IPMs, a final predictor of the current video block, and performing the conversion based on the final predictor, wherein the plurality of sub-templates includes a left sub-template, an above sub-template, an above right sub-template, a left below sub-template, and a left above sub-template.

In another aspect, an apparatus for processing video data comprising a processor and a non-transitory memory with instructions thereon are provided. The instructions upon execution by the processor, cause the processor to construct, during a conversion between a current video block of a video and a bitstream of the video, at least one template set for the current video block from a plurality of sub-templates, derive multiple IPMs based on cost calculations, determine, based on the multiple IPMs, a final predictor of the current video block, and perform the conversion based on the final predictor, wherein the plurality of sub-templates includes a left sub-template, an above sub-template, an above right sub-template, a left below sub-template, and a left above sub-template.

In another aspect, a non-transitory computer-readable recording medium storing a bitstream of a video which is generated by a method performed by a video processing apparatus is provided where the method includes constructing, during a conversion between a current video block of a video and a bitstream of the video, at least one template set for the current video block from a plurality of sub-templates, deriving multiple IPMs based on cost calculations, determining, based on the multiple IPMs, a final predictor of the current video block, and generating the bitstream from the current block based on the final predictor, wherein the plurality of sub-templates includes a left sub-template, an above sub-template, an above right sub-template, a left below sub-template, and a left above sub-template.

In another aspect, a non-transitory computer-readable storage medium storing instructions is provided where the instructions cause a processor to construct, during a conversion between a current video block of a video and a bitstream of the video, at least one template set for the current video block from a plurality of sub-templates, derive multiple IPMs based on cost calculations, determine, based on the multiple IPMs, a final predictor of the current video block, and perform the conversion based on the final predictor, wherein the plurality of sub-templates includes a left sub-template, an above sub-template, an above right sub-template, a left below sub-template, and a left above sub-template To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 24 is a diagram of an example template including a left-above sub-template in accordance with some aspects of the present disclosure.

FIG. 25 is a diagram of an example template including a left sub-template and an above sub-template in accordance with some aspects of the present disclosure.

FIG. 37 is a diagram of example template-reference samples with a horizontal gap for a template including an above sub-template in accordance with some aspects of the present disclosure.

FIG. 39 is a diagram of example template-reference samples with a vertically shifted portion for a template in accordance with some aspects of the present disclosure.

FIG. 40 is a diagram of example template-reference samples with a horizontally shifted portion for a template in accordance with some aspects of the present disclosure.

DETAILED DESCRIPTION

Figure 1:
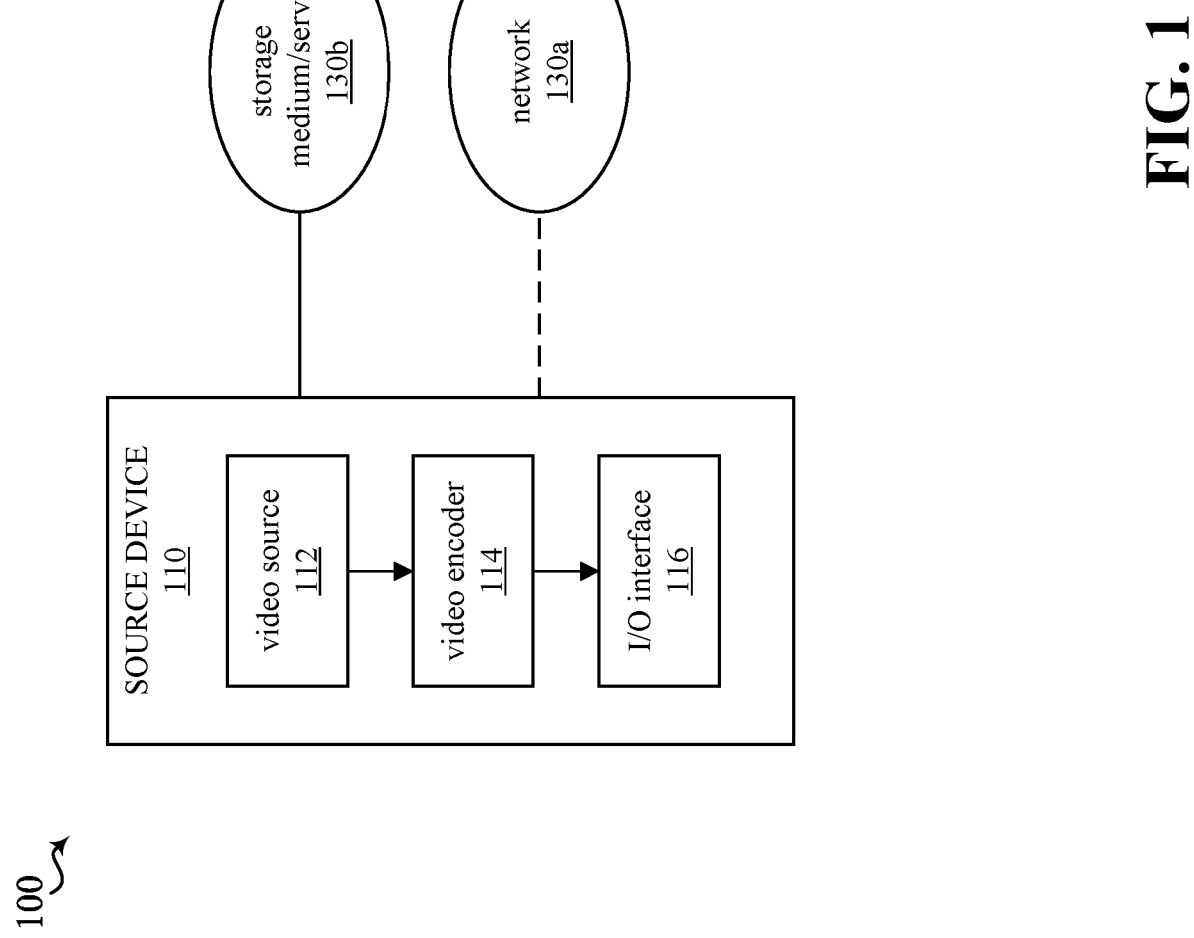
FIG. 1 is a block diagram that illustrates an example of a video coding system, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of video coding and decoding will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects described herein generally relate to using multiple intra-prediction modes (IPMs) in decoding (or encoding) images. For example, video coding technologies, such as high efficiency video coding (HEVC), versatile video coding (VVC), etc., can use IPMs at the encoding side and decoding side to encode/decode each image or frame of a video, such to compress the number of bits in the bitstream, which can provide for efficient storage or transmission of the image or frame, and thus the video. As described in further detail herein, the IPMs are determined or specified per block of an image, where a block can include a portion of the image defined by a subset of coding units CUs or prediction units (PUs) (e.g., N×N CUs or PUs), where each CU or PU can be a pixel, a chroma, a luma, a collection of such, etc. The IPM is then used to predict a given block based on reference pixels, chromas, lumas, etc. of a previously decoded block. This can save from storing or communicating values for each pixel, chroma, or luma, etc. In current video coding technologies, there are a limited number of conventional IPMs (e.g., 67 IPMs in VVC).

In accordance with aspects described herein, given a bitstream that represents an image to be displayed, a block of the image can be derived based multiple IPMs to use in decoding the block. Based on the multiple conventional IPMs, a final predictor can be determined for predicting a current block to be decoded. Using multiple conventional IPMs can facilitate improved or more accurate decoding (or encoding) of the block by effectively allowing use of multiple IPMs, which may achieve a different final predictor than a conventional IPM. In one example, the final predictor can be determined as one of the multiple conventional IPMs, which may be based on a syntax element signaled in the encoding or in separate assistance information. In another example, the final predictor can be determined as a weighted sum of the conventional IPMs, etc.

Additional aspects described herein relate to using the final predictor along with a most probable mode (MPM) list that can also be used to determine or signal an IPM based on IPMs previously used in decoding other blocks. For example, in decoding the block, an IPM can be determined based on the final predictor and based on the MPM list, which can include determining the IPM from the list as the final predictor, or as a conventional IPM (e.g., where the final predictor is not a conventional IPM) based on the MPM list and the final predictor. In another aspect, the final predictor can be used in generating the MPM list to be used in decoding a subsequent block, where the MPM list can be generated to include the final predictor, to include a conventional IPM based on the final predictor, etc. In aspects described herein, using multiple IPMs can allow for improved or more accurate encoding or decoding of blocks of an image (of a video) while providing operability with existing or future video coding technologies.

FIG. 1 is a block diagram that illustrates an example of a video coding system 100 that may utilize the techniques of this disclosure. As shown in FIG. 1, video coding system 100 may include a source device 110 and a destination device 120. The source device 110, which may be referred to as a video encoding device, may generate encoded video data. The destination device 120, which may be referred to as a video decoding device, may decode the encoded video data generated by the source device 110. The source device 110 may include a video source 112, a video encoder 114, and an input/output (I/O) interface 116.

The video source 112 may include a source such as a video capture device, an interface to receive video data from a video content provider, and/or a computer graphics system for generating video data, or a combination of such sources. The video data may comprise one or more pictures or images. The terms "picture," "image," or "frame" can be used interchangeably throughout to refer to a single image in a stream of images that produce a video. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator (modem) and/or a transmitter, a bus, or substantially any mechanism that facilitates transfer of data between devices or within a computing device that may include both the source device 110 and destination device 120 (e.g., where the computing device stores the encoded video generated using functions of the source device 110 for display using functions of the destination device 120). In one example, the encoded video data may be transmitted directly to destination device 120 via the I/O interface 116 through the network 130a. The encoded video data may also be stored onto a storage medium/server 130b for access by destination device 120.

The destination device 120 may include an I/O interface 126, a video decoder 124, and a display device 122. The I/O interface 126 may include a receiver and/or a modem, a bus, or substantially any mechanism that facilitates transfer of data between devices or within a computing device. The I/O interface 126 may acquire encoded video data from the source device 110 or the storage medium/server 130b. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the HEVC standard, VVC standard and other current and/or further standards.

Figure 2:
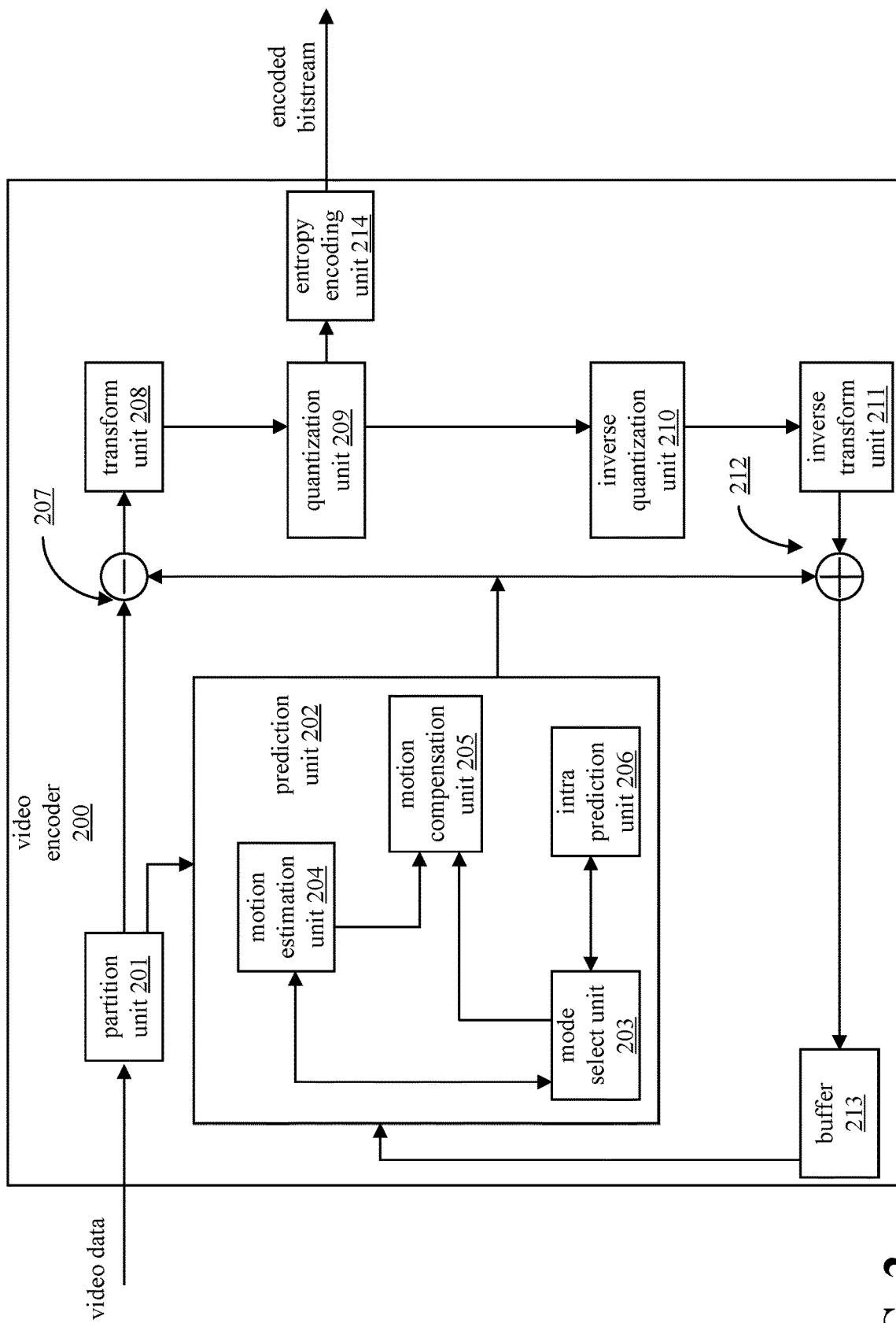
FIG. 2 is a block diagram that illustrates a first example of a video encoder, in accordance with some aspects of the present disclosure.

FIG. 2 is a block diagram illustrating an example of a video encoder 200, which may be an example of the video encoder 114 in the system 100 illustrated in FIG. 1, in accordance with some aspects of the present disclosure.

The video encoder 200 may be configured to perform any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure, including those of video encoder 200.

The functional components of video encoder 200 may include one or more of a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, some components, such as the motion estimation unit 204 and the motion compensation unit 205, may be highly integrated, but are separately represented in the example of FIG. 2 for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra- or inter-coded block to at least one of a residual generation unit 207 to generate residual block data and to a reconstruction unit 212 to reconstruct the encoded block for use as a reference picture. In some examples, the mode select unit 203 may select a combination of intra- and inter-prediction (CIIP) mode in which the prediction is based on an inter-prediction signal and an intra-prediction signal. The mode select unit 203 may also select a resolution for a motion vector (e.g., a sub-pixel or integer pixel precision) for the block in the case of inter-prediction.

To perform inter-prediction on a current video block, the motion estimation unit 204 may generate motion information for the current video block by comparing one or more reference frames from buffer 213 to the current video block. In an example, each reference frame can correspond to a picture of the video. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, in some aspects, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current block based on the reference video block indicated by the motion information of the current video block.

In other examples, the motion estimation unit 204 may perform bi-directional prediction for the current video block, where the motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder.

In some examples, the motion estimation unit 204 may not output a full set of motion information for the current video. Rather, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra-prediction unit 206 may perform intra-prediction on the current video block. When the intra-prediction unit 206 performs intra-prediction on the current video block, the intra-prediction unit 206 may generate prediction data for the current video block based on decoded samples of other video blocks in the same picture. The prediction data for the current video block may include at least one of a predicted video block or one or more syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform unit 208, which may also be referred to as a transform processing unit, may generate one or more transform coefficient video blocks for the current video block by applying one or more transforms to a residual video block associated with the current video block.

After the transform unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
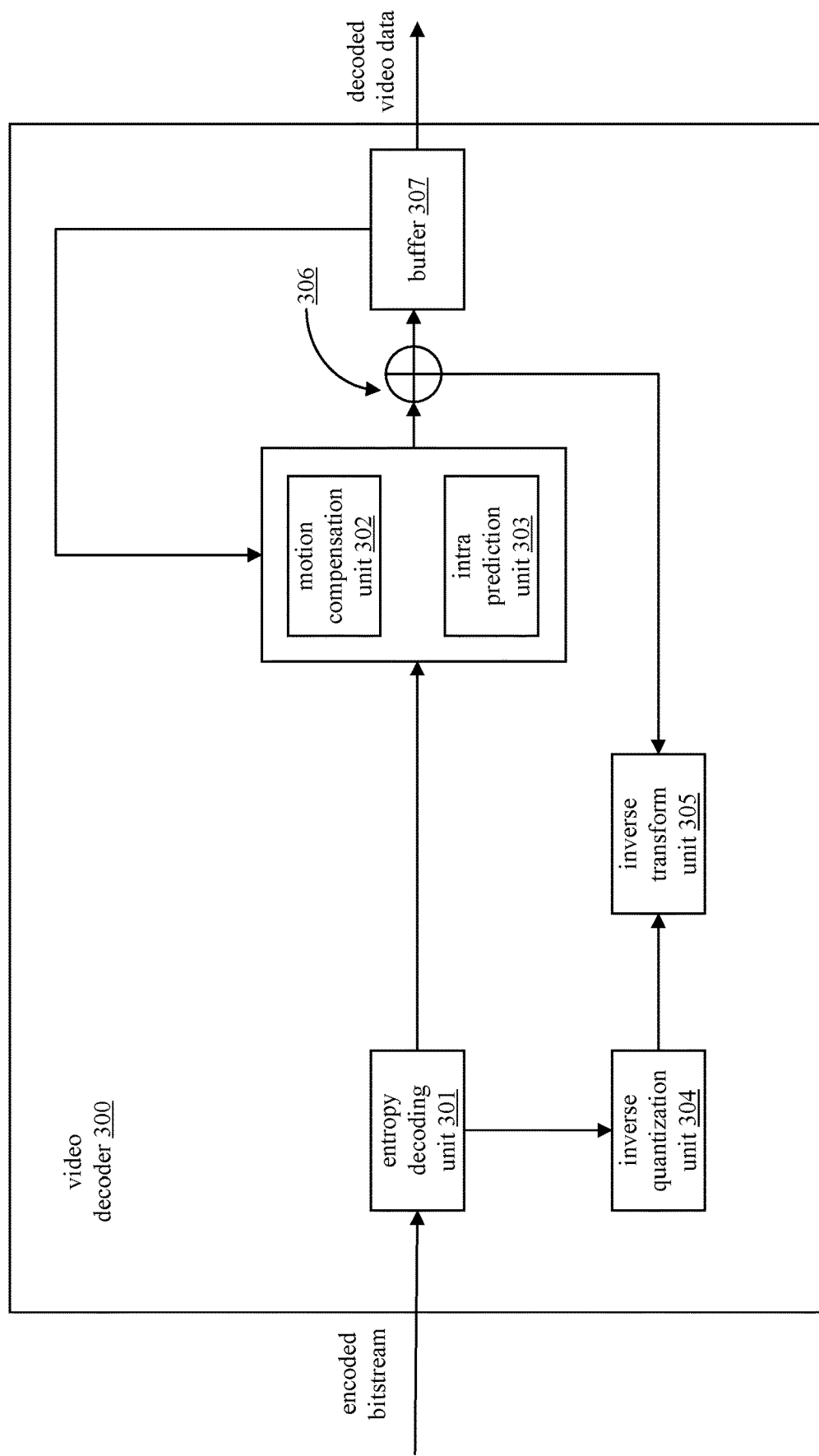
FIG. 3 is a block diagram that illustrates an example of a video decoder, in accordance with some aspects of the present disclosure.

FIG. 3 is a block diagram illustrating an example of video decoder 300, which may be an example of the video decoder 124 in the system 100 illustrated in FIG. 1, in accordance with some aspects of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure, including those of video decoder 300.

In the example of FIG. 3, the video decoder 300 includes one or more of an entropy decoding unit 301, a motion compensation unit 302, an intra-prediction unit 303, an inverse quantization unit 304, an inverse transform unit 305, a reconstruction unit 306, and a buffer 307. The video decoder 300 may, in some examples, perform a decoding pass generally reciprocal to the encoding pass described with respect to video encoder 200 (FIG. 2).

The video decoder 300 may receive, via the entropy decoding unit 301 or otherwise, an encoded bitstream. The encoded bitstream may include entropy coded video data (e.g., encoded blocks of video data). In this example, the entropy decoding unit 301 may decode the entropy coded video data. Based on the decoded video data, whether entropy decoded or otherwise, the motion compensation unit 302 may determine motion information including motion vectors, motion vector precision, reference picture list indexes, and other motion information. The motion compensation unit 302 may, for example, determine such information by performing the AMVP and merge mode. AMVP may be used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in syntax elements received with the encoded bitstream or in separate assistance information, e.g., as specified by a video encoder when encoding the video.

The motion compensation unit 302 may use interpolation filters as used by video encoder 200 during encoding of the video block to calculate interpolated values for sub-integer pixels of a reference block. The motion compensation unit 302 may determine the interpolation filters used by video encoder 200 according to received syntax information and use the interpolation filters to produce predictive blocks.

The motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra-prediction unit 303 may use intra-prediction modes for example received in the bitstream to form a prediction block from spatially adjacent blocks. Intra-prediction can be referred to herein as "intra," and/or intra-prediction modes can be referred to herein as "intra modes" The inverse quantization unit 304 inverse quantizes, i.e., de-quantizes, the quantized video block coefficients provided in the bitstream and decoded by entropy decoding unit 301. Inverse transform unit 305 applies an inverse transform.

The reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra-prediction and also produces decoded video for presentation on a display device.

Although the following description may be focused on High Efficiency Video Coding (HEVC), and/or the standard Versatile Video Coding (VVC), the concepts described herein may be applicable to other coding standards or video codec.

Figure 4:
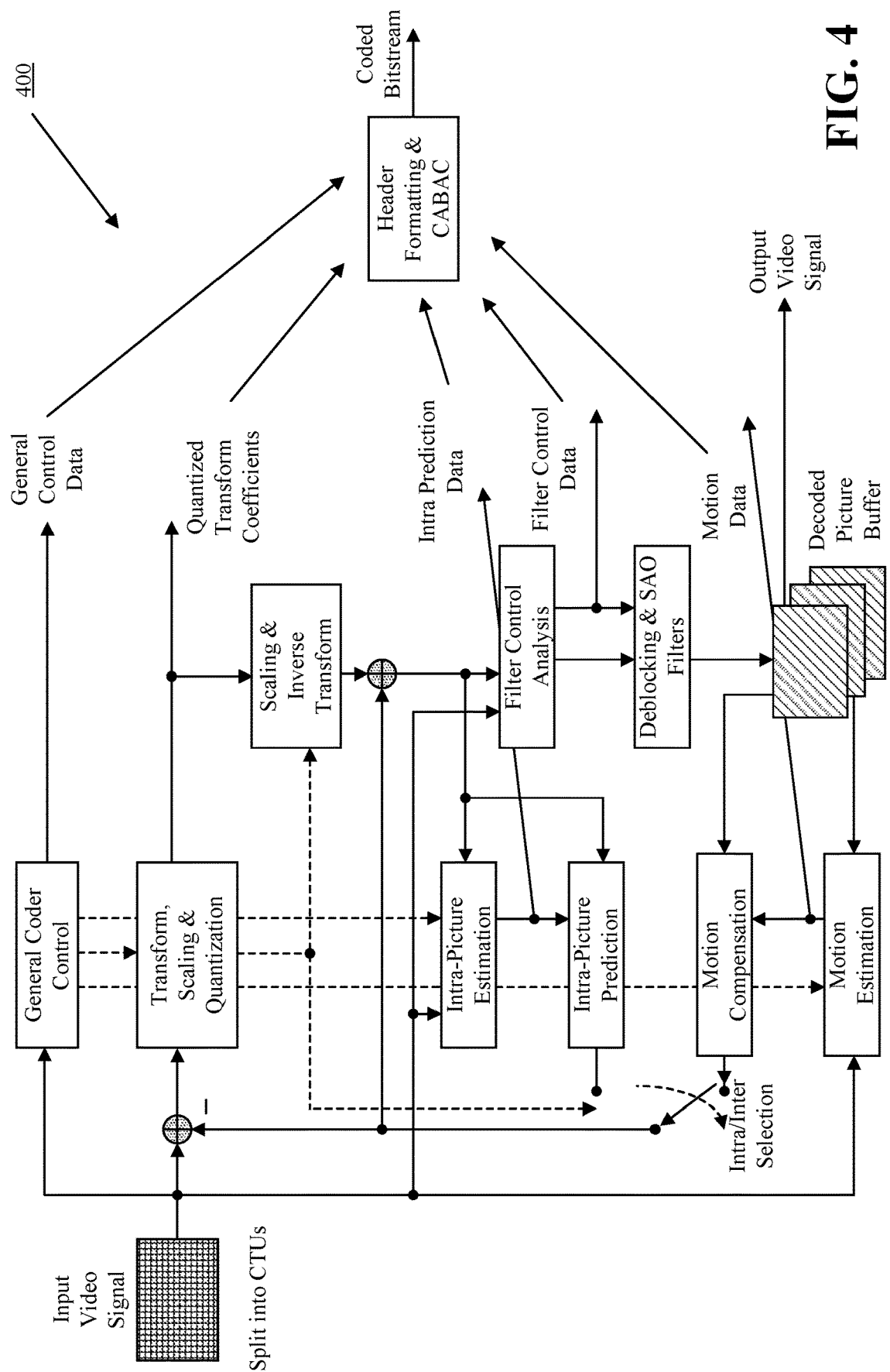
FIG. 4 is a block diagram that illustrates a second example of a video encoder, in accordance with some aspects of the present disclosure.

FIG. 4 shows an example of a block diagram of a HEVC video encoder and decoder 400, which may be the video encoder 114 and video decoder 124 in the system 100 illustrated in FIG. 1, video encoder 200 in FIG. 2 and video decoder 300 in FIG. 3, etc., in accordance with some aspects of the present disclosure. The encoding algorithm for generating HEVC-compliant bitstreams may proceed as follows. Each picture can be divided into block regions (e.g., coding tree units (CTUs)), and the precise block division may be transmitted to the decoder. A CTU consists of a luma coding tree block (CTB) and the corresponding chroma CTBs and syntax elements. The size L×L of a luma CTB can be chosen as L=16, 32, or 64 samples, where the larger sizes can enable higher compression. HEVC then supports a partitioning of the CTBs into smaller blocks using a tree structure and quadtree-like signaling. The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs may be jointly signaled. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

The first picture of the video sequence (and/or the first picture at each clean random access point that enters the video sequence) can use only intra-picture prediction, which uses region-to-region spatial data prediction within the same picture, but does not rely on other pictures to encode the first picture. For the remaining pictures between sequential or random access points, the inter-picture temporal prediction coding mode may be used for most blocks. The encoding process for inter-picture prediction includes selecting motion data including a selected reference picture and a motion vector (MV) to be applied to predict samples of each block.

The decision whether to code a picture area using inter-picture or intra-picture prediction can be made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. The prediction residual is coded using block transforms. A TU tree structure has its root at the CU level. The luma CB residual may be identical to the luma transform block (TB) or may be further split into smaller luma TBs. The same applies to the chroma TBs.

The encoder and decoder may apply motion compensation (MC) by using MV and mode decision data to generate the same inter-picture prediction signal, which is transmitted as auxiliary information. The residual signal of intra-picture or inter-picture prediction can be transformed by linear spatial transformation, which is the difference between the original block and its prediction. Then the transform coefficients can be scaled, quantized, entropy encoded, and transmitted together with the prediction information.

The encoder can duplicate the decoder processing loop so that both can generate the same prediction for subsequent data. Therefore, the quantized transform coefficients can be constructed by inverse scaling, and then can be inversely transformed to replicate the decoding approximation of the residual signal. The residual can then be added to the prediction, and the result of this addition can then be fed into one or two loop filters to smooth the artifacts caused by block-by-block processing and quantization. The final picture representation (i.e., the copy output by the decoder) can be stored in the decoded picture buffer for prediction of subsequent pictures. In general, the order of encoding or decoding processing of pictures may be different from the order in which they arrive from the source. As such, in some examples, it may be necessary to distinguish between the decoding order of the decoder (that is, the bit stream order) and the output order (that is, the display order).

Video material encoded by HEVC can be input as a progressive image (e.g., because the source video originates from this format or is generated by de-interlacing before encoding). There is no explicit coding feature in the HEVC design to support the use of interlaced scanning, because interlaced scanning is no longer used for displays and becomes very uncommon for distribution. However, metadata syntax has been provided in HEVC to allow the encoder to indicate that it has been sent by encoding each area of the interlaced video (i.e., even or odd lines of each video frame) into a separate picture interlaced video, or by encoding each interlaced frame as a HEVC encoded picture to indicate that it has been sent. This can provide an effective method for encoding interlaced video without the need to support special decoding processes for it.

Figure 5:
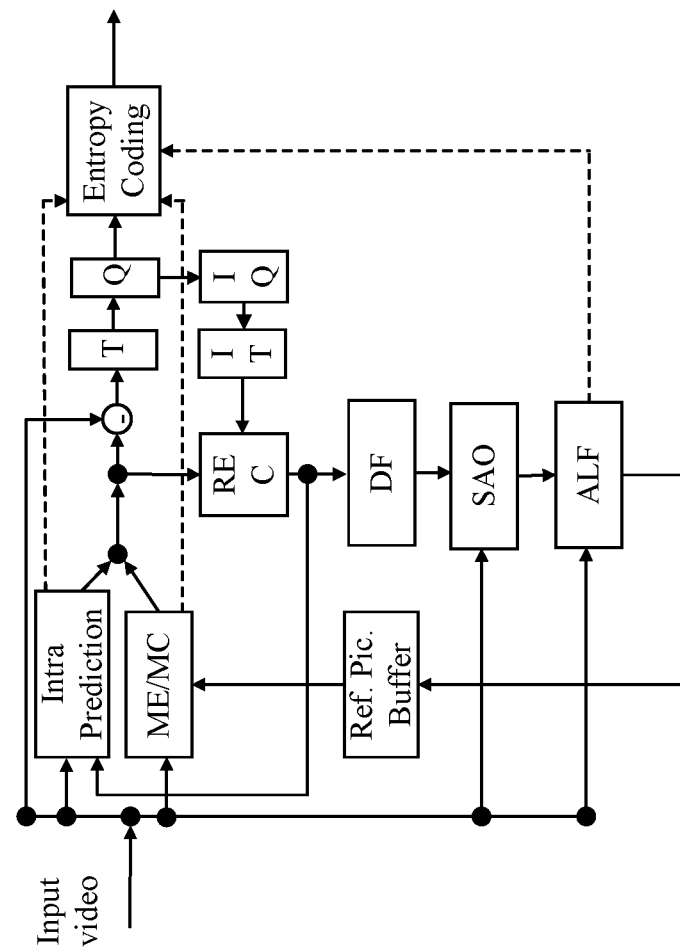
FIG. 5 is an example of an encoder block diagram of versatile video coding (VVC) in accordance with some aspects of the present disclosure.

FIG. 5 is an example of an encoder block diagram 500 of VVC, which can include multiple in-loop filtering blocks: e.g., deblocking filter (DF), sample adaptive offset (SAO) adaptive loop filter (ALF), etc. Unlike DF, which uses predefined filters, SAO and ALF may utilize the original samples of the current picture to reduce the mean square errors between the original samples and the reconstructed samples by adding an offset and by applying a finite impulse response (FIR) filter, respectively, with coded side information signaling the offsets and filter coefficients. ALF may be located at the last processing stage of each picture and can be regarded as a tool to catch and fix artifacts created by the previous stages.

Figure 6:
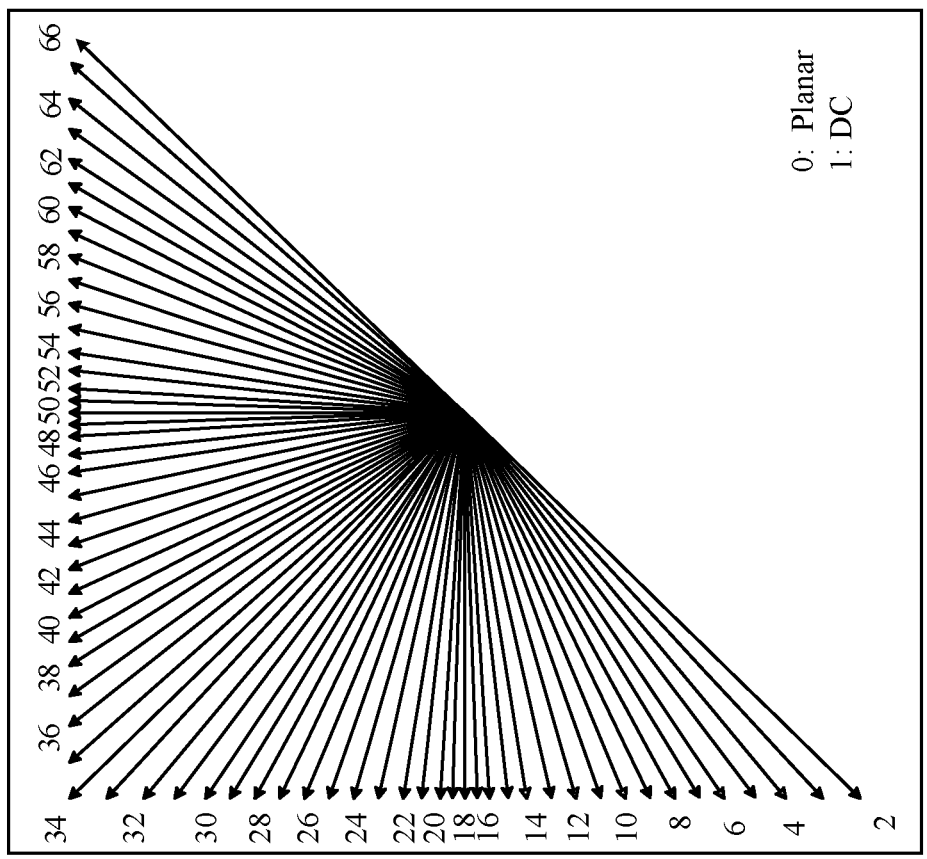
FIG. 6 is a schematic diagram of intra mode coding with 67 intra-prediction modes to capture the arbitrary edge directions presented in natural video in accordance with some aspects of the present disclosure.

FIG. 6 is a schematic diagram 600 of intra-prediction mode coding with 67 intra-prediction modes to capture the arbitrary edge directions presented in natural video. In some examples, the number of directional intra modes may be extended from 33, as used in HEVC, to 65 while the planar and the DC modes remain the same.

In some examples, the denser directional intra-prediction modes may apply for the block sizes and for both luma and chroma intra-predictions. In the HEVC, every intra-prediction mode coded block may include a square shape (e.g., a coded block of size N×N) and the length of each of its side may be a power of 2 (e.g., where N is a power of 2). Thus, no division operations are required to generate an intra-predictor using DC mode. In VVC, blocks can have a rectangular shape that may necessitate the use of a division operation per block in the general case. To avoid division operations for DC prediction, the longer side may be used to compute the average for non-square blocks.

Although 67 modes are defined in the VVC, the exact prediction direction for a given intra-prediction mode index may be further dependent on the block shape. Conventional angular intra-prediction directions are defined from 45 degrees to −135 degrees in clockwise direction. In VVC, several conventional angular intra-prediction modes may be adaptively replaced with wide-angle intra-prediction modes for non-square blocks. The replaced modes may be signaled using the original mode indexes, which are remapped to the indexes of wide angular modes after parsing. In some examples, the total number of intra-prediction modes may be unchanged, i.e., 67, and the intra mode coding method may also be unchanged.

Figure 7:
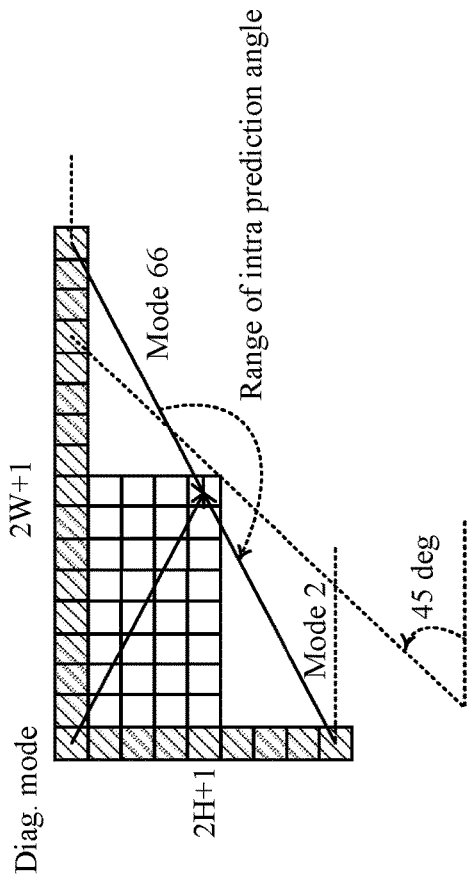
FIGS. 7 and 8 are reference example diagrams of wide-angular intra-prediction in accordance with some aspects of the present disclosure.
Figure 8:
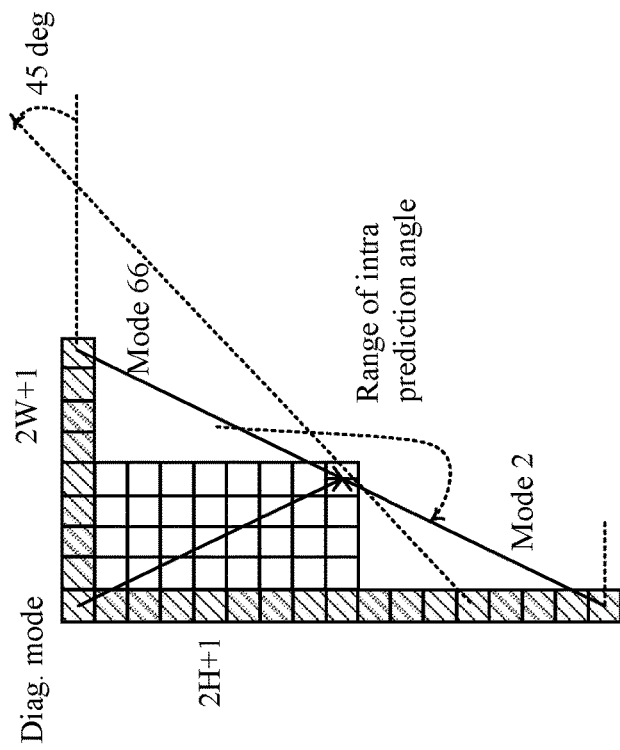

FIGS. 7 and 8 are reference example diagrams 700 and 800 of wide-angular intra-prediction. In some examples, the number of replaced modes in wide-angular direction mode may depend on the aspect ratio of a block. The replaced intra-prediction modes are illustrated in Table 1:

TABLE 1

Intra-prediction modes replaced by wide-angular modes

| Aspect ratio | Replaced intra-prediction modes |
|---|---|
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 9:
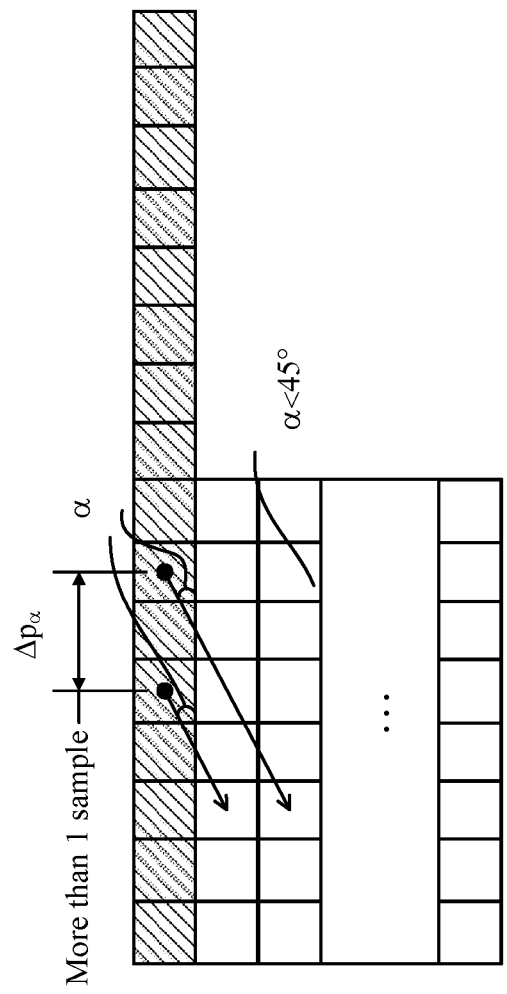
FIG. 9 is a diagram of discontinuity in case of directions that exceed 45° angle in accordance with some aspects of the present disclosure.

FIG. 9 is a diagram 900 of discontinuity in case of directions that exceed 45° angle. In such instance, two vertically adjacent predicted samples may use two non-adjacent reference samples in the case of wide-angle intra-prediction. Hence, low-pass reference samples filter and side smoothing may be applied to the wide-angle prediction to reduce the negative effect of the increased gap $\Delta p_\alpha$. If a wide-angle mode represents a non-fractional offset, there may be 8 modes in the wide-angle modes satisfy this condition, which are [−14, −12, −10, −6, 72, 76, 78, 80]. When a block is predicted by these modes, the samples in the reference buffer can be directly copied without applying any interpolation. With this modification, the number of samples to be smoothed may be reduced.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra-prediction modes. As HEVC specification does not support prediction angle below −135 degree and above 45 degree, luma intra-prediction modes ranging from 2 to 5 may be mapped to 2. Therefore, chroma DM derivation table for 4:2:2 chroma format can be updated by replacing some values of the entries of the mapping table to convert prediction angle more precisely for chroma blocks.

In some aspects, for each inter-predicted CU, motion parameters consisting of motion vectors, reference picture indices and reference picture list usage index, and additional information used for the new coding feature of VVC may be used for inter-predicted sample generation. The motion parameter can be signaled in an explicit or implicit manner. When a CU is coded with skip mode, the CU may be associated with one PU and may have no significant residual coefficients, no coded motion vector delta or reference picture index. A merge mode may be specified where the motion parameters for the current CU can be obtained from neighboring CUs, including spatial and temporal candidates, and additional schedules introduced in VVC. The merge mode can be applied to any inter-predicted CU, not only for skip mode. The alternative to merge mode may be the explicit transmission of motion parameters, where motion vector, corresponding reference picture index for each reference picture list and reference picture list usage flag and other needed information are signaled explicitly per each CU.

Additionally or alternatively, intra block copy (IBC) may be a tool adopted in HEVC extensions on SCC, and thus may be used by a video encoder 114, 200, 400, as described herein in encoding video, and/or by a video decoder 124, 300, 400, as described herein in decoding video. Such a tool may improve the coding efficiency of screen content materials. As IBC mode may be implemented as a block level coding mode, block matching (BM) may be performed at the encoder to find the optimal block vector (or motion vector) for each CU. Here, a block vector is used to indicate the displacement from the current block to a reference block, which is already reconstructed inside the current picture. The luma block vector of an IBC-coded CU may be in integer precision. The chroma block vector can round to integer precision as well. When combined with AMVR, the IBC mode can switch between 1-pel and 4-pel motion vector precisions. An IBC-coded CU may be treated as the third prediction mode other than intra- or inter-prediction modes. The IBC mode may be applicable to the CUs with both width and height smaller than or equal to 64 luma samples.

At the encoder side, hash-based motion estimation may be performed for IBC. The encoder performs RD check for blocks with either width or height no larger than 16 luma samples. For non-merge mode, the block vector search may be performed using hash-based search first. If hash search does not return valid candidate, block matching based local search may be performed. In the hash-based search, hash key matching (32-bit cyclic redundancy check (CRC)) between the current block and a reference block may be extended to all allowed block sizes. The hash key calculation for every position in the current picture may be based on 4×4 sub-blocks. For the current block of a larger size, a hash key may be determined to match that of the reference block when all the hash keys of all 4×4 sub-blocks match the hash keys in the corresponding reference locations. If hash keys of multiple reference blocks are found to match that of the current block, the block vector costs of each matched reference may be calculated and the one with the minimum cost may be selected.

In some examples, in block matching search, the search range may be set to cover both the previous and current CTUs. At CU level, IBC mode may be signaled with a flag and it can be signaled as IBC AMVP mode or IBC skip/merge mode. In one example, such as IBC skip/merge mode, a merge candidate index may be used to indicate which of the block vectors in the list from neighboring candidate IBC coded blocks is used to predict the current block. The merge list may include spatial, HMVP, and pairwise candidates.

In another example, such as IBC AMVP mode, a block vector difference may be coded in the same way as a motion vector difference. The block vector prediction method uses two candidates as predictors, one from left neighbor and one from above neighbor (if IBC coded). When either neighbor is not available, a default block vector can be used as a predictor. A flag can be signaled to indicate the block vector predictor index.

To reduce the cross-component redundancy, a cross-component linear model (CCLM) prediction mode may be used in the VVC, for which the chroma samples are predicted based on the reconstructed luma samples of the same CU by using a linear model as follows:

$$\text{pred}_C(i,j) = \alpha \cdot \text{rec}_L'(i,j) + \beta \qquad \text{Equation 1}$$

In such instance, $\text{pred}_C(i, j)$ may represent the predicted chroma samples in a CU and $\text{rec}_L(i, j)$ may represent the down-sampled reconstructed luma samples of the same CU. The CCLM parameters ($\alpha$ and $\beta$) may be derived with at most four neighboring chroma samples and their corresponding down-sampled luma samples. For instance, suppose the current chroma block dimensions are W×H, then W'' and H' are set as W'=W, H'=H when LM mode is applied; W'=W+H when LM-T mode is applied; and H'=H+W when LM-L mode is applied.

The above neighboring positions may be denoted as S[0, −1] . . . S[W'−1, −1] and the left neighboring positions may be denoted as S[−1, 0] . . . S[−1, H'−1]. Then the four samples are selected as S[W'/4, −1], S[3*W'/4, −1], S[−1, H'/4], S[−1, 3*H'/4] when LM mode is applied and both above and left neighboring samples are available; S[ W'/8, −1], S[ 3*W'/8, −1], S[5*W'/8, −1], S[ 7*W'/8, −1] when LM-T mode is applied or only the above neighboring samples are available; and S[−1, H'/8], S[−1, 3*H'/8], S[−1, 5*H'/8], S[−1, 7*H'/8] when LM-L mode is applied or only the left neighboring samples are available.

In some aspects, the four neighboring luma samples at the selected positions may be down-sampled and compared four times to find two larger values: $x^0_A$ and $x^1_A$, and two smaller values: $x^0_B$ and $x^1_B$. Their corresponding chroma sample values may be denoted as $y^0_A$, $y^0_B$ and $y^1_B$. Then $x_A$, $x_B$, $y_A$ and $y_B$ may be derived as:

$$X_a = (x^0_A + x^1_A + 1) \gg 1; \ X_b = (x^0_B + x^1_B + 1) \gg 1; \ Y_a = (y^0_A + y^1_A + 1) \gg 1; \ Y_b = (y^0_B + y^1_B + 1) \gg 1 \quad \text{Equation 2}$$

Finally, the linear model parameters a and may be obtained according to the following equations:

$$\alpha = \frac{Y_a - Y_b}{X_a - X_b} \quad \text{Equation 3}$$

$$\beta = Y_b - \alpha \cdot X_b \quad \text{Equation 4}$$

Figure 10:
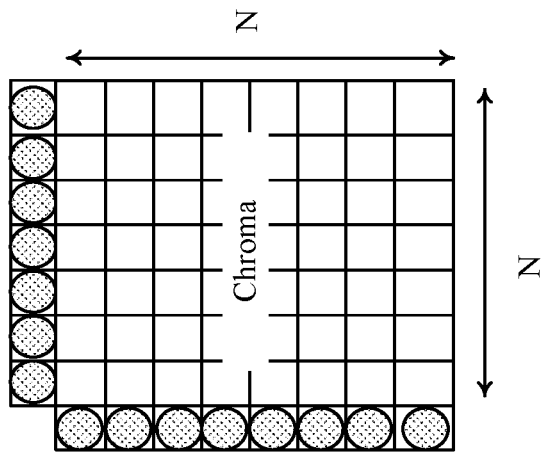
FIG. 10 is a schematic diagram of location of the samples used for the derivation of $\alpha$ and $\beta$ for the chroma in accordance with some aspects of the present disclosure.
Figure 11:
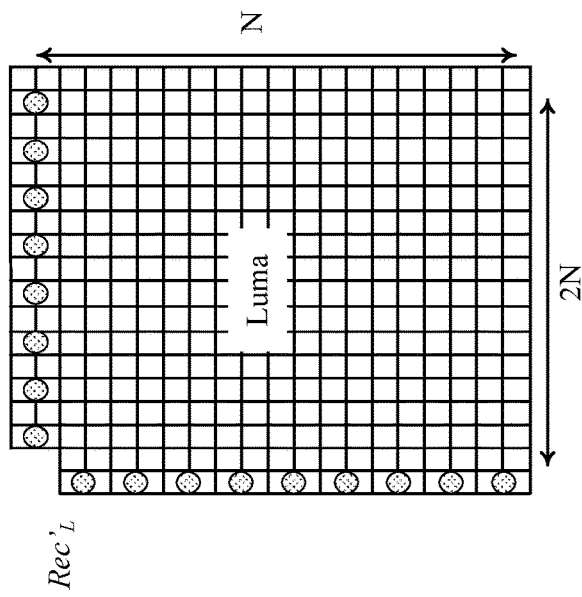
FIG. 11 is a schematic diagram of location of the samples used for the derivation of $\alpha$ and $\beta$ for the luma in accordance with some aspects of the present disclosure.
Figure 12:
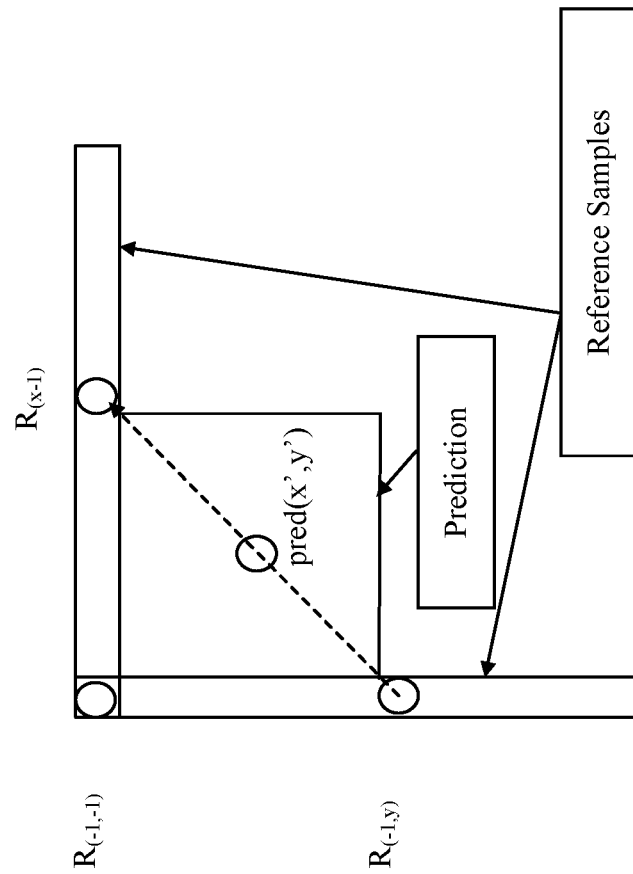
FIGS. 12-15 illustrate examples of reference samples (Rx,−1 and R−1,y) for PDPC applied over various prediction modes in accordance with some aspects of the present disclosure.
Figure 13:
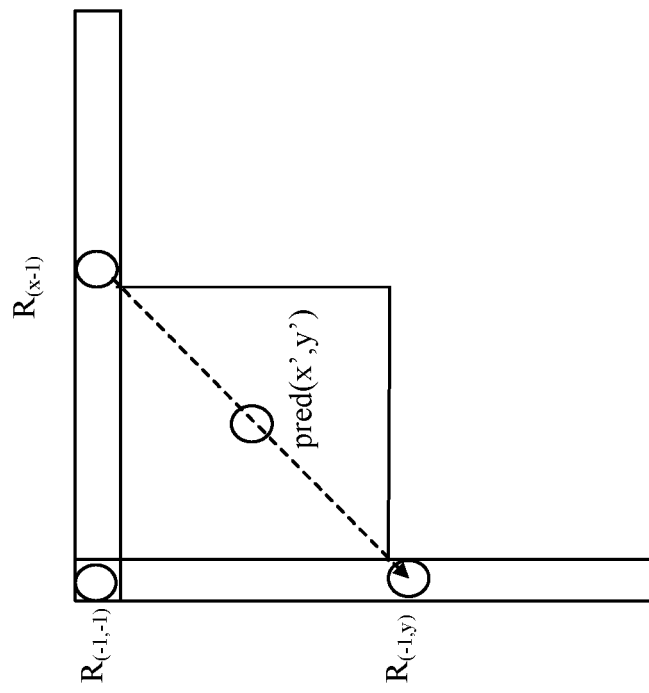
Figure 14:
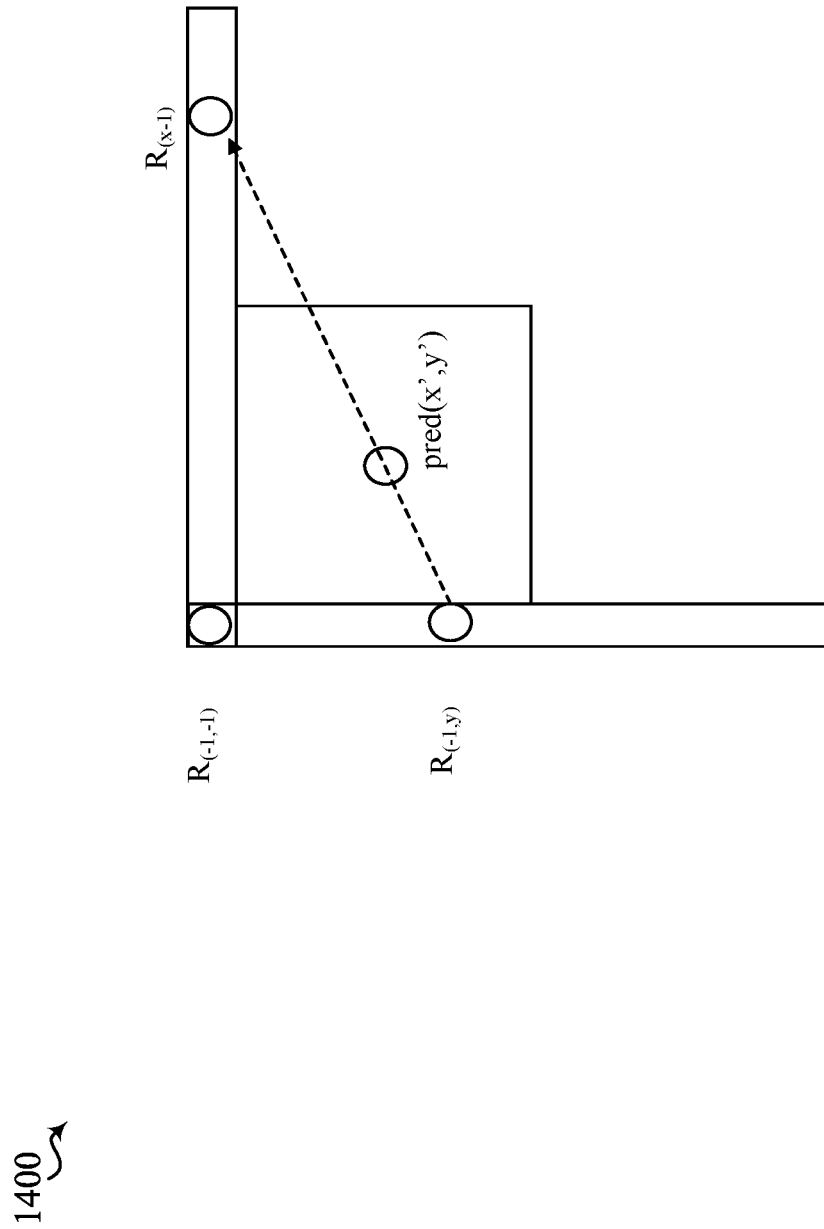
Figure 15:
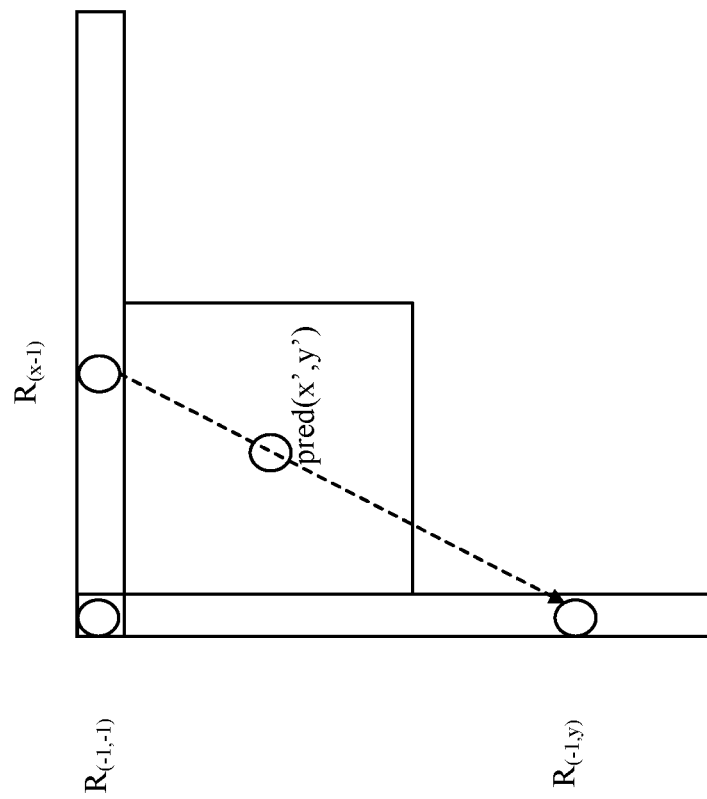

FIG. 10 is a schematic diagram 1000 of location of the samples used for the derivation of α and β for the chroma. FIG. 11 is a schematic diagram 1100 of location of the samples used for the derivation of α and β for the luma. For both FIGS. 10 and 11, the division operation to calculate parameter a may be implemented with a look-up table. To reduce the memory required for storing the table, the diff value (difference between maximum and minimum values) and the parameter a may be expressed by an exponential notation. For example, the diff value is approximated with a 4-bit significant part and an exponent. Consequently, the table for 1/diff is reduced into 16 elements for 16 values of the significand as follows:

DivTable[ ]={0,7, 6, 5, 5, 4, 4, 3, 3, 2, 2, 1, 1, 1, 1, 0}

Table 2

In an example, the above template and left template can be used to calculate the linear model coefficients together. In another example, the above template and left template can be used alternatively in the other 2 LM modes, called LM_T, and LM_L modes. In LM_T mode, only the above template may be used to calculate the linear model coefficients. To get more samples, the above template is extended to (W+H) samples. In LM_L mode, only left template is used to calculate the linear model coefficients. To get more samples, the left template may be extended to (H+W) samples. In LM mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = [rec_L(2i-1, 2j) + 2 \cdot rec_L(2i-1, 2j-1) + \\ rec_L(2i+1, 2j-1) + rec_L(2i-1, 2j) + \\ 2 \cdot rec_L(2i, 2j) + rec_L(2i+1, 2j) + 4] \gg 3 \quad \text{Equation 5}$$

$$rec'_L(i, j) = \\ [rec_L(2i, 2j-1) + rec_L(2i-1, 2j) + 4 \cdot rec_L(2i, 2j) + \\ rec_L(2i+1, 2j) + rec_L(2i, 2j+1) + 4] \gg 3 \quad \text{Equation 6}$$

Note that only one luma line (general line buffer in intra-prediction) may be used to make the down-sampled luma samples when the upper reference line is at the CTU boundary. This parameter computation may be performed as part of the decoding process, and not just as an encoder search operation. As a result, no syntax may be used to convey the α and β values to the decoder.

For chroma intra-prediction mode coding, a total of 8 intra-prediction modes are allowed for chroma intra mode coding. Those modes include five traditional intra-prediction modes and three cross-component linear model modes (LM, LM_T, and LM_L). Chroma mode signaling and derivation process are shown in Table 3 below. Chroma mode coding directly depends on the intra-prediction mode of the corresponding luma block. As separate block partitioning structure for luma and chroma components is enabled in I slices, one chroma block may correspond to multiple luma blocks. Therefore, for Chroma DM mode, the intra-prediction mode of the corresponding luma block covering the center position of the current chroma block can be directly inherited.

TABLE 3

Chroma mode signaling and derivation process

| Chroma prediction mode | Corresponding luma intra-prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or LM modes (1). If it is LM mode, then the next bin indicates whether it is LM_CHROMA (0) or not (1). If it is not LM_CHROMA, next bin indicates whether it is LM_L (0) or LM_T (1). For this case, when sps_cclm_enabled_flag is 0, the first bin of the binarization table for the corresponding intra_chroma_pred_mode can be discarded prior to the entropy coding. In other words, the first bin is inferred to be 0 and hence not coded. This single binarization table is used for both sps_cclm_enabled_flag equal to 0 and 1 cases. The first two bins in Table 4 are context coded with its own context model, and the rest of the bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node is allowed to use CCLM in the following way: If the 32×32 chroma node is not split or partitioned QT split, all chroma CUs in the 32×32 node can use CCLM; Alternatively, if the 32×32 chroma node is partitioned with Horizontal BT, and the 32×16 child node does not split or uses Vertical BT split, all chroma CUs in the 32×16 chroma node can use CCLM. In all the other luma and chroma coding tree split conditions, CCLM is not allowed for chroma CU.

In VVC, the results of intra-prediction of DC, planar and several angular modes may further be modified by a position dependent prediction combination (PDPC) method. PDPC is a prediction method that invokes a combination of the boundary reference samples and HEVC style prediction with filtered boundary reference samples. PDPC can be applied to the following intra modes without signaling: planar, DC, intra angles less than or equal to horizontal, and intra angles greater than or equal to vertical and less than or equal to 80. If the current block is BDPCM mode or MRL index is larger than 0, PDPC is not applied.

The prediction sample pred(x',y') is predicted using an intra-prediction mode (DC, planar, angular) and a linear combination of reference samples according to the Equation 7 as follows:

$$\text{pred}(x',y')=\text{Clip}(0,(1<<\text{BitDepth})-1,(wL \times R_{-1,y'}+wT \times R_{x',-1}+(64-wL-wT) \times \text{pred}(x',y')+32)>>6) \quad \text{Equation 7}$$

In the above equation, $R_{x,-1}$, $R_{-1,y}$ may represent the reference samples located at the top and left boundaries of current sample (x, y), respectively In some aspects, if PDPC is applied to DC, planar, horizontal, and vertical intra modes, additional boundary filters may not be needed, as currently required in the case of HEVC DC mode boundary filter or horizontal/vertical mode edge filters. PDPC process for DC and planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

FIGS. 12-15 illustrate examples of reference samples 1200, 1300, 1400, 1500 ($R_{x,-1}$ and $R_{-1,y}$) for PDPC applied over various prediction modes. The prediction sample pred (x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular mode, the reference samples $R_{x,-1}$ and $R_{-1,y}$ could be located in fractional sample position. In this case, the sample value of the nearest integer sample location is used.

Figure 16:
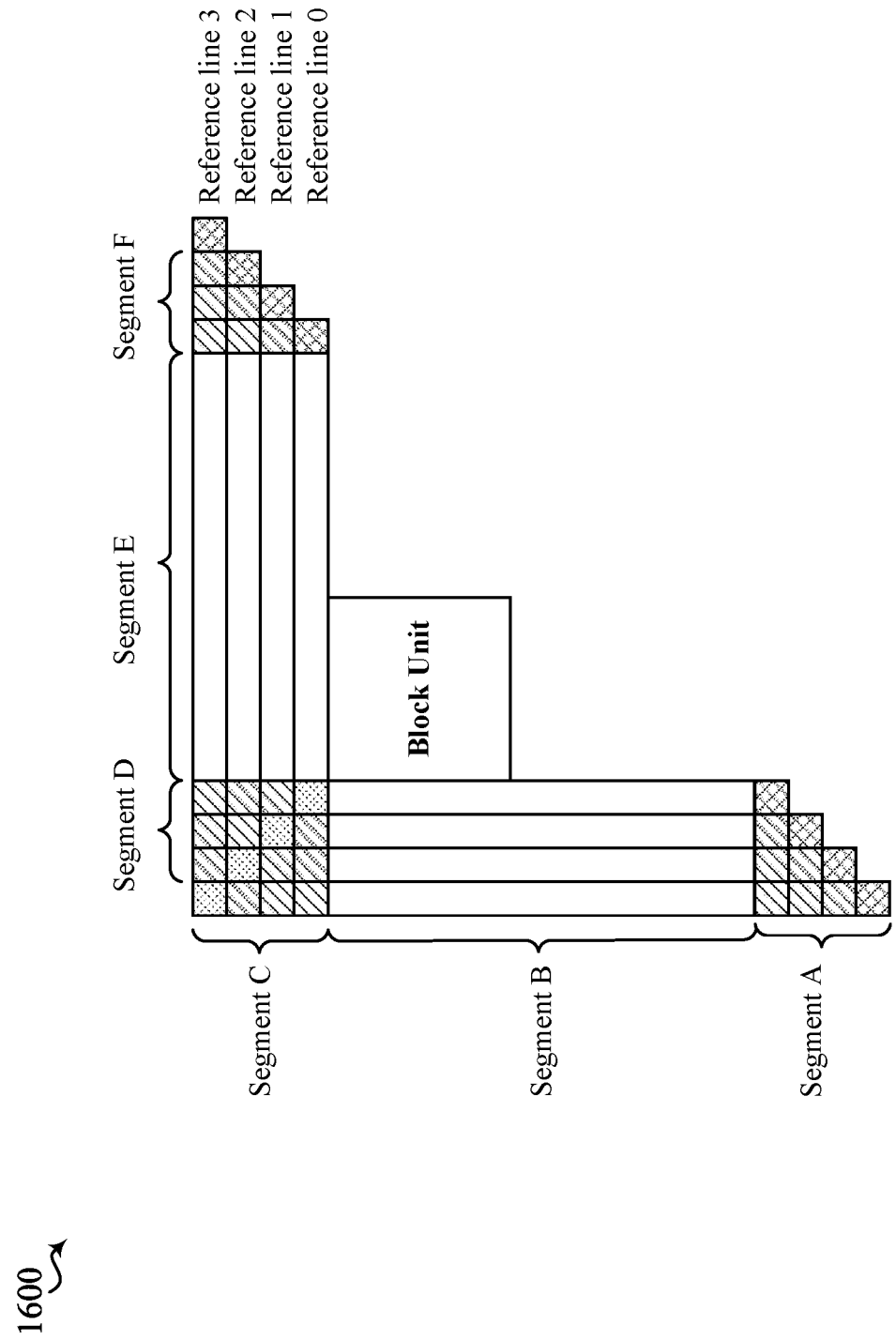
FIG. 16 is a diagram of multiple reference line (MRL) intra-prediction used in accordance with aspects of the present disclosure.

FIG. 16 is a diagram 1600 of multiple reference line (MRL) intra-prediction used in accordance with aspects of the present disclosure. In some examples, the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

In some examples of video coding, the index of selected reference line (mrl_idx) can be signaled and used to generate intra predictor. For reference line index, which is greater than 0, the most probable mode (MPM) list may only include additional reference line modes and the MPM index can be signaled without remaining modes. The reference line index can be signaled before intra-prediction modes, and planar mode can be excluded from intra-prediction modes in case a non-zero reference line index is signaled.

MRL can be disabled for the first line of blocks inside a CTU to prevent using extended reference samples outside the current CTU line. Also, PDPC can be disabled when an additional line is used. For MRL mode, the derivation of DC value in DC intra-prediction mode for non-zero reference line indices can be aligned with that of reference line index 0. MRL may store 3 neighboring luma reference lines with a CTU to generate predictions. The Cross-Component Linear Model (CCLM) tool may store 3 neighboring luma reference lines for its down-sampling filters. The definition of MRL to use the same 3 lines can be aligned as CCLM to reduce the storage requirements for decoders.

Figure 17:
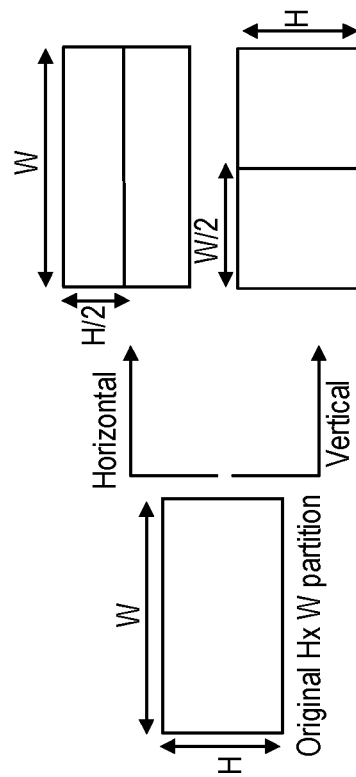
FIGS. 17 and 18 are example diagrams and of an intra sub-partitions (ISP) that divides luma intra-predicted blocks vertically or horizontally into sub-partitions depending on the block size in accordance with some aspects of the present disclosure.
Figure 18:
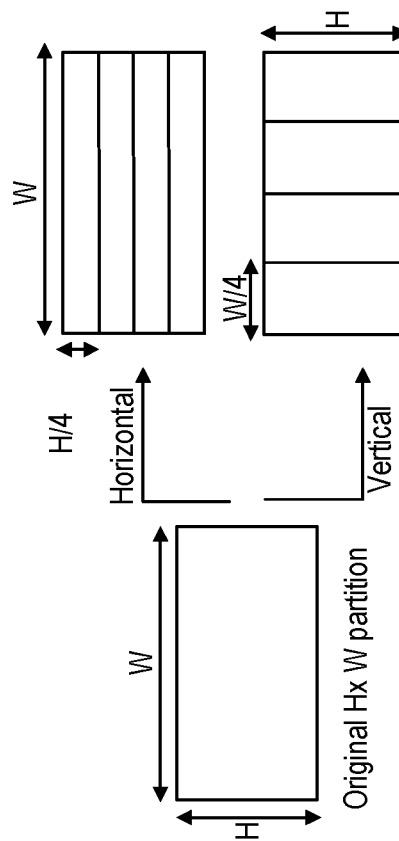

FIGS. 17 and 18 are examples of diagrams 1700 and 1800 of an intra sub-partitions (ISP) that divides luma intra-predicted blocks vertically or horizontally into sub-partitions depending on the block size. For example, minimum block size for ISP is 4×8 (or 8×4). If block size is greater than 4×8 (or 8×4) then the corresponding block can be divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding $$\frac{M}{2} \times 64$$

chroma TBs. If the CU uses ISP, then the luma TB can be divided into four M×32 TBs (only the horizontal split is possible), each of them smaller than a 64×64 block. However, in the current design of ISP chroma blocks are not divided. Therefore, both chroma components may have a size greater than a 32×32 block. Analogously, a similar situation could be created with a 128×N CU using ISP. Hence, these two cases may be an issue for the 64×64 decoder pipeline. For this reason, the CU sizes that can use ISP may be restricted to a maximum of 64×64. FIGS. 17 and 18 shows examples of the two possibilities. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. In this example, there may be no delay, or reduced delay, added in processing these smaller blocks than processing 4×4 regular-coded intra blocks.

TABLE 5

| Block Size | Coefficient group Size |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition can be available to generate the prediction of the next sub-partition, and each sub-partition is repeatedly processed. In addition, the first sub-partition to be processed is the one containing the top-left sample of the CU and then continuing downwards (horizontal split) or rightwards (vertical split). As a result, reference samples used to generate the sub-partitions prediction signals may only be located at the left and above sides of the lines. All sub-partitions can share the same intra mode. The followings are summary of interaction of ISP with other coding tools.

In one example, MRL may be implemented if a block has an MRL index other than 0, then the ISP coding mode can be inferred to be 0 and therefore ISP mode information may not be sent to the decoder. In another example, entropy coding coefficient group size may be selected if the sizes of the entropy coding subblocks have been modified so that they have 16 samples in all possible cases, as shown in Table 5. Note that the new sizes may only affect blocks produced by ISP in which one of the dimensions is less than 4 samples. In all other cases coefficient groups may keep the 4×4 dimensions.

Additionally or alternatively, with respect to coded block flag (CBF) coding, it is assumed to have at least one of the sub-partitions has a non-zero CBF. Hence, if n is the number of sub-partitions and the first n−1 sub-partitions have produced a zero CBF, then the CBF of the n-th sub-partition can be inferred to be 1. Transform size restriction: all ISP transforms with a length larger than 16 points can use the discrete cosine transform (DCT)-II. Multiple transform selection (MTS) flag: if a CU uses the ISP coding mode, the MTS CU flag may be set to 0 and it may not be sent to the decoder. Therefore, the encoder may not perform rate distortion (RD) tests for the different available transforms for each resulting sub-partition. The transform choice for the ISP mode may instead be fixed and selected according to the intra mode, the processing order and the block size utilized. Hence, no signaling may be required, in this example.

For example, let $t_H$ and $t_V$ be the horizontal and the vertical transforms selected respectively for the w×h sub-partition, where w is the width and h is the height. Then the transform can be selected according to the following rules: If w=1 or h=1, then there may be no horizontal or vertical transform respectively. If w≥4 and w≤16, $t_H$=discrete sine transform (DST)-VII, otherwise, $t_H$=DCT-II. If h≥4 and h≤16, $t_V$=DST-VII, otherwise, $t_V$=DCT-II.

In ISP mode, all 67 intra-prediction modes are allowed. PDPC can also be applied if corresponding width and height is at least 4 samples long. In addition, the reference sample filtering process (reference smoothing) and the condition for intra interpolation filter selection may not exist anymore, and Cubic (DCT-IF) filter can be applied for fractional position interpolation in ISP mode.

Figure 19:
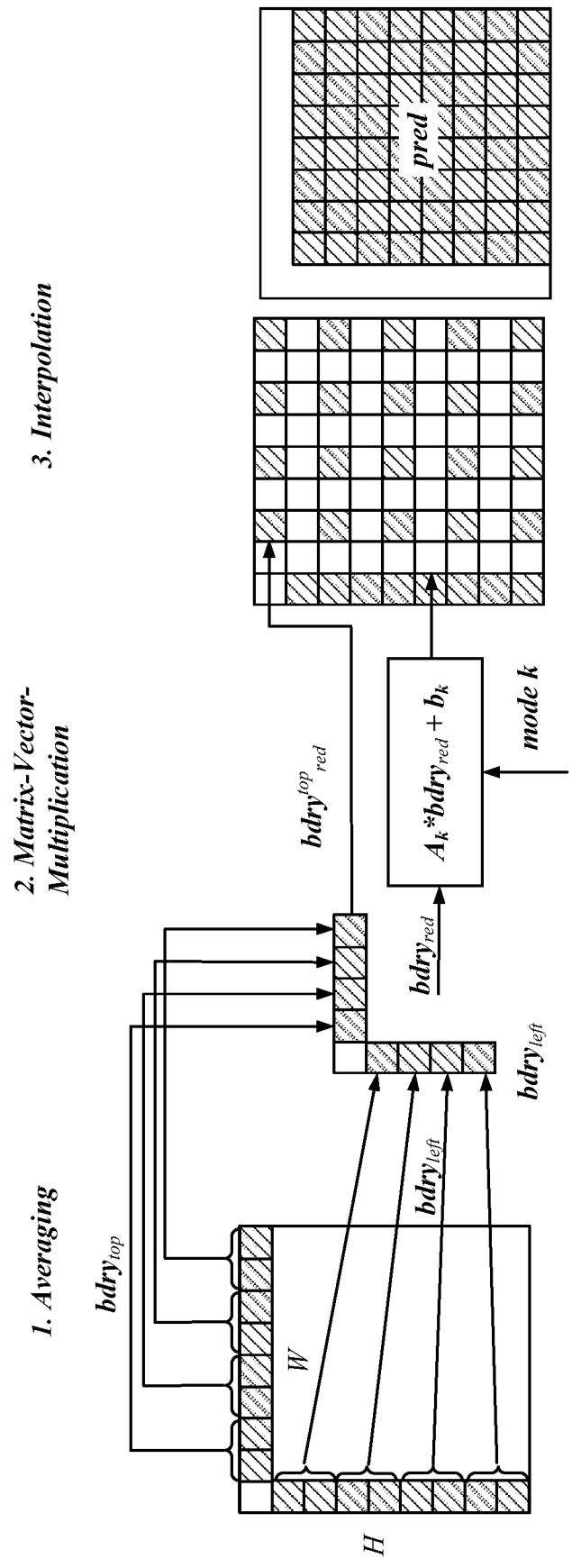
FIG. 19 is a diagram of a matrix weighted intra-prediction process (MIP) method for VVC in accordance with some aspects of the present disclosure.

FIG. 19 is an example of a diagram 1900 of matrix weighted intra-prediction process (MIP) for VVC. For predicting the samples of a rectangular block of width W and height H, −MIP takes one line of H reconstructed neighboring boundary samples left of the block and one line of W reconstructed neighboring boundary samples above the block as input. If the reconstructed samples are unavailable, they can be generated as in the conventional intra-prediction.

Among the boundary samples, four samples or eight samples can be selected by averaging based on block size and shape. Specifically, the input boundaries $bdry^{top}$ and $bdry^{left}$ are reduced to smaller boundaries $bdry_{red}^{top}$ and $bdry_{red}^{left}$ by averaging neighboring boundary samples according to predefined rule depends on block size. Then, the two reduced boundaries $bdry_{red}^{top}$ and $bdry_{red}^{left}$ can be concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6. \end{cases} \quad \text{Equation 8}$$

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the down-sampled block of width $W_{red}$ and height $H_{red}$ is generated. Here, $W_{red}$ and $H_{red}$ are defined as:

$$W_{red} = \begin{cases} 4 & \text{for max}(W, H) \leq 8 \\ \min(W, 8) & \text{for max}(W, H) > 8 \end{cases} \quad \text{Equation 9}$$

$$H_{red} = \begin{cases} 4 & \text{for max}(W, H) \leq 8 \\ \min(H, 8) & \text{for max}(W, H) > 8 \end{cases}$$

The reduced prediction signal $pred_{red}$ may be computed by calculating a matrix vector product and adding an offset:

$$pred_{red} = A \cdot bdry_{red} + b \quad \text{Equation 10}$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8. \end{cases} \quad \text{Equation 11}$$

Here, each coefficient of the matrix A is represented with 8 bit precision. The set $S_0$ consists of 16 matrices $A_0^i$, i∈{0, . . . , 15} each of which has 16 rows and 4 columns and 16 offset vectors $b_0^i$, i∈{0, . . . , 16} each of size 16. Matrices and offset vectors of that set are used for blocks of size 4×4. The set $S_1$ consists of 8 matrices $A_1^i$, i∈{0, . . . , 7}, each of which has 16 rows and 8 columns and 8 offset vectors $b_1^i$, i∈{0, . . . , 7} each of size 16. The set $S_2$ consists of 6 matrices $A_2^i$, i∈{0, . . . , 5}, each of which has 64 rows and 8 columns and of 6 offset vectors $b_2^i$, i∈{0, . . . , 5} of size 64.

In some examples, the prediction signal at the remaining positions may be generated from the prediction signal on the subsampled set by linear interpolation which is a single step linear interpolation in each direction. The interpolation can be firstly performed in the horizontal direction and then in the vertical direction regardless of block shape or block size.

For each CU in intra mode, a flag indicating whether an MIP mode may be to be applied or not is sent. If an MIP mode is to be applied, MIP mode (predModeIntra) may be signaled. For an MIP mode, a transposed flag (isTransposed), which determines whether the mode is transposed, and MIP mode ID (modeId), which determines which matrix is to be used for the given MIP mode, can be derived as follows isTransposed=predModeIntra&1 modeId=predModeIntra>>1  Equation 12

MIP coding mode may be harmonized with other coding tools by considering following aspects: (1) low-frequency non-separable transform (LFNST) is enabled for MIP on large blocks. Here, the LFNST transforms of planar mode are used; (2) the reference sample derivation for MIP is performed exactly or at least similarly as for the conventional intra-prediction modes; (3) for the up-sampling step used in the MIP-prediction, original reference samples are used instead of down-sampled ones; (4) clipping is performed before up-sampling and not after up-sampling; (5) MIP may be allowed up to 64×64 regardless of the maximum transform size. In some aspects, the number of MIP modes may be 32 for sizeId=0, 16 for sizeId=1 and 12 for sizeId=2.

In joint exploration model (JEM)-2.0 intra modes are extended to 67 from 35 modes in HEVC, and they are derived at encoder and explicitly signaled to decoder. A significant amount of overhead is spent on intra mode coding in JEM-2.0. For example, the intra mode signaling overhead may be up to 5~10% of overall bitrate in all intra coding configuration. This contribution proposes the decoder-side intra mode derivation approach to reduce the intra mode coding overhead while keeping prediction accuracy. To reduce the overhead of intra mode signaling, a decoder-side intra mode derivation (DIMD) approach, which may be used by video decoders 124, 300, 400 in decoding video. In accordance with aspects of the present disclosure, instead of signaling intra mode explicitly, the information can be derived at both encoder and decoder from the neighboring reconstructed samples of current block. The intra mode derived by DIMD may be used in two ways, for example: 1) For 2N×2N CUs, the DIMD mode is used as the intra mode for intra-prediction when the corresponding CU-level DIMD flag is turned on; 2) For N×N CUs, the DIMD mode is used to replace one candidate of the existing MPM list to improve the efficiency of intra mode coding.

Figure 20:
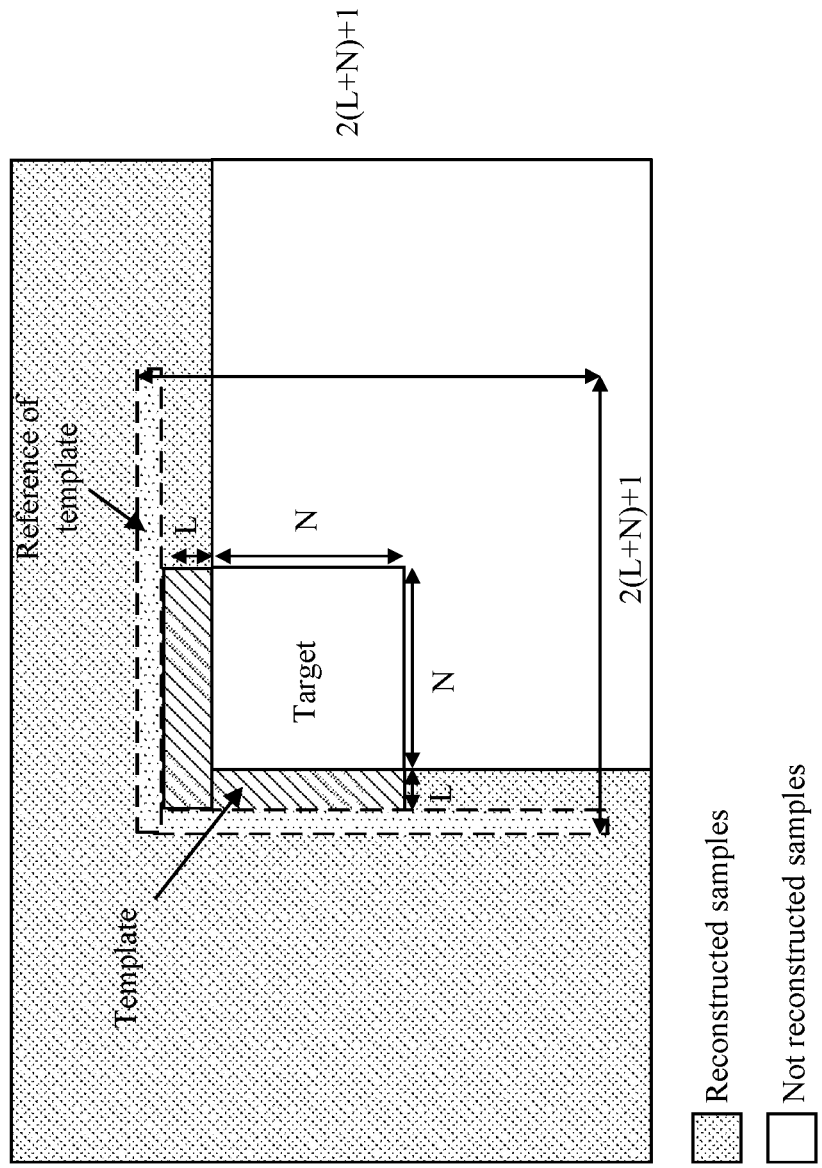
FIG. 20 is a diagram of a template based intra mode derivation where the target denotes the current block (of block size N) for which intra-prediction mode is to be estimated in accordance with some aspects of the present disclosure.

FIG. 20 is an example of a diagram 2000 of a template based intra mode derivation where the target denotes the current block (of block size N) for which intra-prediction mode is to be estimated. The template (indicated by the patterned region in FIG. 20) specifies a set of already reconstructed samples, which are used to derive the intra mode. The template size is denoted as the number of samples within the template that extends to the above and the left of the target block, i.e., L. In some implementations, a template size of 2 (i.e., L=2) can be used for 4×4 and 8×8 blocks and a template size of 4 (i.e., L=4) can be used for 16×16 and larger blocks. The reference of template (indicated by the dotted region in FIG. 20) can refer to a set of neighboring samples from above and left of the template, as defined by JEM-2.0. Unlike the template samples which are always from reconstructed region, the reference samples of template may not be reconstructed yet when encoding/decoding the target block. In this case, the existing reference samples substitution algorithm of JEM-2.0 is utilized to substitute the unavailable reference samples with the available reference samples.

For each intra-prediction mode, the DIMD calculates the absolute difference (SAD) between the reconstructed template samples and its prediction samples obtained from the reference samples of the template. The intra-prediction mode that yields the minimum SAD may be selected as the final intra-prediction mode of the target block.

For intra 2N×2N CUs, the DIMD can be used as one additional intra mode, which can be adaptively selected by comparing the DIMD intra mode with the optimal normal intra mode (i.e., being explicitly signaled). One flag is signaled for each intra 2N×2N CU to indicate the usage of the DIMD. If the flag is one, then the CU can be predicted using the intra mode derived by DIMD; otherwise, the DIMD is not applied and the CU is predicted using the intra mode explicitly signaled in the bit-stream. When the DIMD is enabled, chroma components can reuse the same intra mode as that derived for luma component, i.e., DM mode.

Additionally, for each DIMD-coded CU, the blocks in the CU can adaptively select to derive their intra modes at either PU-level or TU-level. Specifically, when the DIMD flag is one, another CU-level DIMD control flag can be signaled to indicate the level at which the DIMD is performed. If this flag is zero, this can indicate that the DIMD is performed at the PU level and all the TUs in the PU use the same derived intra mode for their intra-prediction; otherwise if the DIMD control flag is one, this can indicate that the DIMD is performed at the TU level and each TU in the PU derives its own intra mode.

Further, when the DIMD is enabled, the number of angular directions increases to 129, and the DC and planar modes still remain the same. To accommodate the increased granularity of angular intra modes, the precision of intra interpolation filtering for DIMD-coded CUs increases from 1/32-pel to 1/64-pel. Additionally, in order to use the derived intra mode of a DIMD coded CU as MPM candidate for neighboring intra blocks, those 129 directions of the DIMD-coded CUs can be converted to "normal" intra modes (i.e., 65 angular intra directions) before they are used as MPM.

In some aspects, intra modes of intra N×N CUs are signaled. However, to improve the efficiency of intra mode coding, the intra modes derived from DIMD are used as MPM candidates for predicting the intra modes of four PUs in the CU. In order to not increase the overhead of MPM index signaling, the DIMD candidate can be placed at the first place in the MPM list and the last existing MPM candidate can be removed. Also, a pruning operation can be performed such that the DIMD candidate may not be added to the MPM list if it is redundant.

In order to reduce encoding/decoding complexity, one straightforward fast intra mode search algorithm is used for DIMD. Firstly, one initial estimation process can be performed to provide a good starting point for intra mode search. Specifically, an initial candidate list can be created by selecting N fixed modes from the allowed intra modes. Then, the SAD can be calculated for all the candidate intra modes and the one that minimizes the SAD can be selected as the starting intra mode. To achieve a good complexity/performance trade-off, the initial candidate list can include 11 intra modes, including DC, planar and every 4-th mode of the 33 angular intra directions as defined in HEVC, i.e., intra modes 0, 1, 2, 6, 10 . . . 30, 34.

If the starting intra mode is either DC or planar, it can be used as the DIMD mode. Otherwise, based on the starting intra mode, one refinement process can then be applied where the optimal intra mode is identified through one iterative search. In the iterative search, at each iteration, the SAD values for three intra modes separated by a given search interval can be compared and the intra mode that minimizes the SAD can be maintained. The search interval can then be reduced to half, and the selected intra mode from the last iteration can serve as the center intra mode for the current iteration. For the current DIMD implementation with 129 angular intra directions, up to 4 iterations can be used in the refinement process to find the optimal DIMD intra mode.

In some examples, transmitting of the luma intra-prediction mode in the bitstream can be avoided. This is done by deriving the luma intra mode using previously encoded/decoded pixels, in an identical fashion at the encoder and at the decoder. This process defines a new coding mode called DIMD, whose selection signaled in the bitstream for intra coded blocks using a flag. DIMD can compete with other coding modes at the encoder, including the classic Intra coding mode (where the intra-prediction mode is coded). Note that in one example, DIMD may only apply to luma. For chroma, classical intra coding mode may apply. As done for other coding modes (classical intra, inter, merge, etc.), a rate-distortion cost can be computed for the DIMD mode, and can then be compared to the coding costs of other modes to decide whether to select it as final coding mode for a current block.

At the decoder side, the DIMD flag can be first parsed, if present. If the DIMD flag is true, the intra-prediction mode can be derived in the reconstruction process using the same previously encoded neighboring pixels. If not, the intra-prediction mode can be parsed from the bitstream as in classical intra coding mode.

Figure 21:
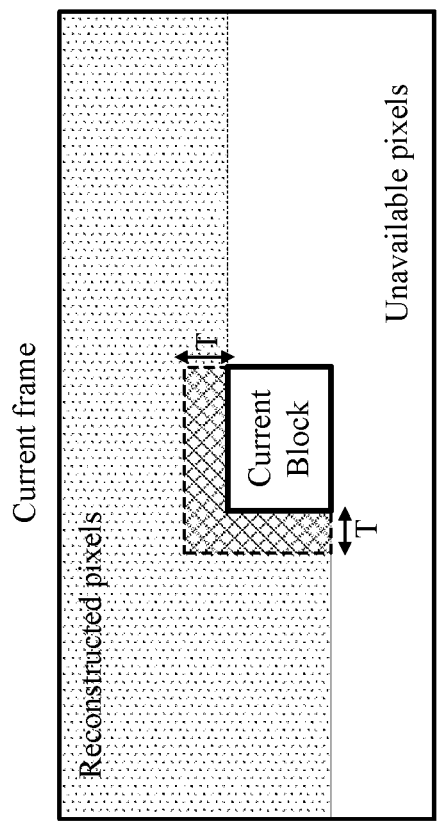
FIG. 21 is a diagram of a template of a set of chosen pixels on which a gradient analysis may be performed based on intra-prediction mode derivation in accordance with some aspects of the present disclosure.

To derive the intra-prediction mode for a block, a set of neighboring pixels may be first selected on which a gradient analysis is performed. For normativity purposes, these pixels can be in the decoded/reconstructed pool of pixels. FIG. 21 is an example of a diagram 2100 of a template of a set of chosen pixels on which a gradient analysis may be performed based on intra-prediction mode derivation. As shown in FIG. 21, a template surrounding the current block is chosen by T pixels to the left, and T pixels above. For example, T may have a value of 2.

Next, a gradient analysis is performed on the pixels of the template. This can facilitate determining a main angular direction for the template, which can be assumed to have a high chance to be identical to the one of the current block. Thus, a simple 3×3 Sobel gradient filter can be used, defined by the following matrices that may be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

For each pixel of the template, each of these two matrices with the 3×3 window centered around the current pixel can be point-by-point multiplied and composed of its 8 direct neighbors, and the result can be is summed. Thus, two values $G_x$ (from the multiplication with $M_x$), and $G_y$ (from the multiplication with $M_y$) corresponding to the gradient at the current pixel can be obtained, in the horizontal and vertical direction respectively.

Figure 22:
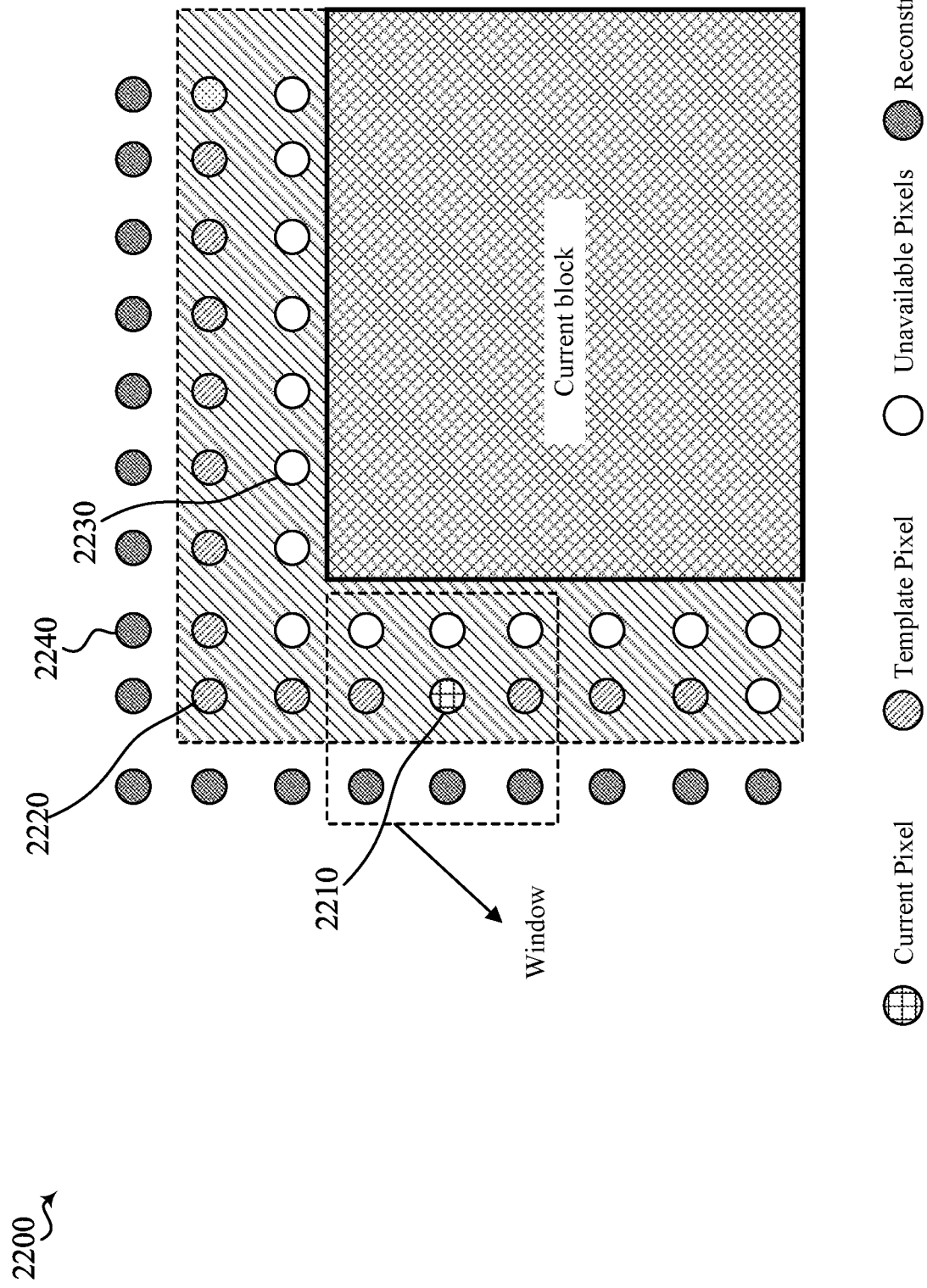
FIG. 22 is a diagram of a convolution of a 3×3 sobel gradient filter with the template in accordance with aspects of the present disclosure.

FIG. 22 is an example of a diagram of a convolution of a 3×3 Sobel gradient filter with the template in accordance with aspects of the present disclosure. In some examples, the pixel 2210 is the current pixel. Template pixels 2220 (including the current pixel 2210) are pixels on which gradient analysis is possible. Unavailable pixels 2230 are pixels on which the gradient analysis is not possible due to lack of some neighbors. Reconstructed pixels 2240 are available pixels outside of the considered template, used in the gradient analysis of the template pixels 2220. In case a reconstructed pixel 2240 is not available (due to blocks being too close to the border of the picture for instance), the gradient analysis of all template pixels 2220 that use the unavailable reconstructed pixel 2240 is not performed.

For each template pixel 2220, the intensity (G) and the orientation (O) of the gradient using $G_x$ and $G_y$ are calculated as such:

$$G = |G_x| + |G_y| \text{ and } O = \operatorname{atan}\left(\frac{G_y}{G_x}\right)$$

Note that a fast implementation of the atan function is proposed. The orientation of the gradient can then be converted into an intra angular prediction mode, used to index a histogram (first initialized to zero). The histogram value at that intra angular mode is increased by G. Once all the template pixels 2220 in the template have been processed, the histogram can include cumulative values of gradient intensities, for each intra angular mode. The mode that shows the highest peak in the histogram can be selected as intra-prediction mode for the current block. If the maximum value in the histogram is 0 (meaning no gradient analysis was able to be made, or the area composing the template is flat), then the DC mode can be selected as intra-prediction mode for the current block.

For blocks that are located at the top of CTUs, the gradient analysis of the pixels located in the top part of the template is not performed. The DIMD flag is coded using three possible contexts, depending on the left and above neighboring blocks, similarly to the Skip flag coding. Context 0 corresponds to the case where none of the left and above neighboring blocks are coded with DIMD mode, context 1 corresponds to the case where only one neighboring block is coded with DIMD, and context 2 corresponds to the case where both neighbors are DIMD-coded. Initial symbol probabilities for each context are set to 0.5.

One advantage that DIMD offers over classical intra mode coding is that the derived intra mode can have a higher precision, allowing more precise predictions at no additional cost as it is not transmitted in the bitstream. The derived intra mode spans 129 angular modes, hence a total of 130 modes including DC (e.g., the derived intra mode may not be planar in aspects described herein). The classical intra coding mode is unchanged, i.e., the prediction and mode coding still use 67 modes.

The required changes to Wide Angle Intra-prediction and simplified PDPC were performed to accommodate for prediction using 129 modes. Note that only the prediction process uses the extended intra modes, meaning that for any other purpose (deciding whether to filter the reference samples for instance), the mode can be converted back to 67-mode precision.

In the DIMD mode, the luma intra mode is derived during the reconstruction process, just prior to the block reconstruction. This is done to avoid a dependency on reconstructed pixels during parsing. However, by doing so, the luma intra mode of the block may be undefined for the chroma component of the block, and for the luma component of neighboring blocks. This can cause an issue because for chroma, a fixed mode candidate list is defined. Usually, if the luma mode equals one of the chroma candidates, that candidate may be replaced with the vertical diagonal (VDIA_IDX) intra mode. As in DIMD, the luma mode is unavailable, the initial chroma mode candidate list is not modified.

In classical intra mode, where the luma intra-prediction mode is to be parsed from the bitstream, an MPM list is constructed using the luma intra modes of neighboring blocks, which can be unavailable if those blocks were coded using DIMD. In this case, for example, DIMD-coded blocks can be treated as inter blocks during MPM list construction, meaning they are effectively considered unavailable.

Entropy coding may be a form of lossless compression used at the last stage of video encoding (and the first stage of video decoding), after the video has been reduced to a series of syntax elements. Syntax elements describe how the video sequence can be reconstructed at the decoder. This includes the method of prediction (e.g., spatial or temporal prediction, intra-prediction mode, and motion vectors) and prediction error, also referred to as residual. Arithmetic coding is a type of entropy coding that can achieve compression close to the entropy of a sequence by effectively mapping the symbols (i.e., syntax elements) to codewords with a non-integer number of bits. Context-adaptive binary arithmetic coding (CABAC) involves three main functions: binarization, context modeling, and arithmetic coding. Binarization maps the syntax elements to binary symbols (bins). Context modeling estimates the probability of the bins. Finally, arithmetic coding compresses the bins to bits based on the estimated probability.

Several different binarization processes are used in VVC, such as the truncated Rice (TR) binarization process, the truncated binary binarization process, the k-th order Exp-Golomb (EGk) binarization process and the fixed-length (FL) binarization process.

Context modeling provides an accurate probability estimate required to achieve high coding efficiency. Accordingly, it is highly adaptive and different context models can be used for different bins and the probability of that context model is updated based on the values of the previously coded bins. Bins with similar distributions often share the same context model. The context model for each bin can be selected based on the type of syntax element, bin position in syntax element (binIdx), luma/chroma, neighboring information, etc. A context switch can occur after each bin.

Arithmetic coding may be based on recursive interval division. A range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization may be used whenever the range falls below a certain value to prevent underflow. Renormalization can occur after each bin is decoded. Arithmetic coding can be done using an estimated probability (context coded), or assuming equal probability of 0.5 (bypass coded). For bypass coded bins, the division of the range into subintervals can be done by a shift, whereas a look up table may be used for the context coded bins.

Figure 23:
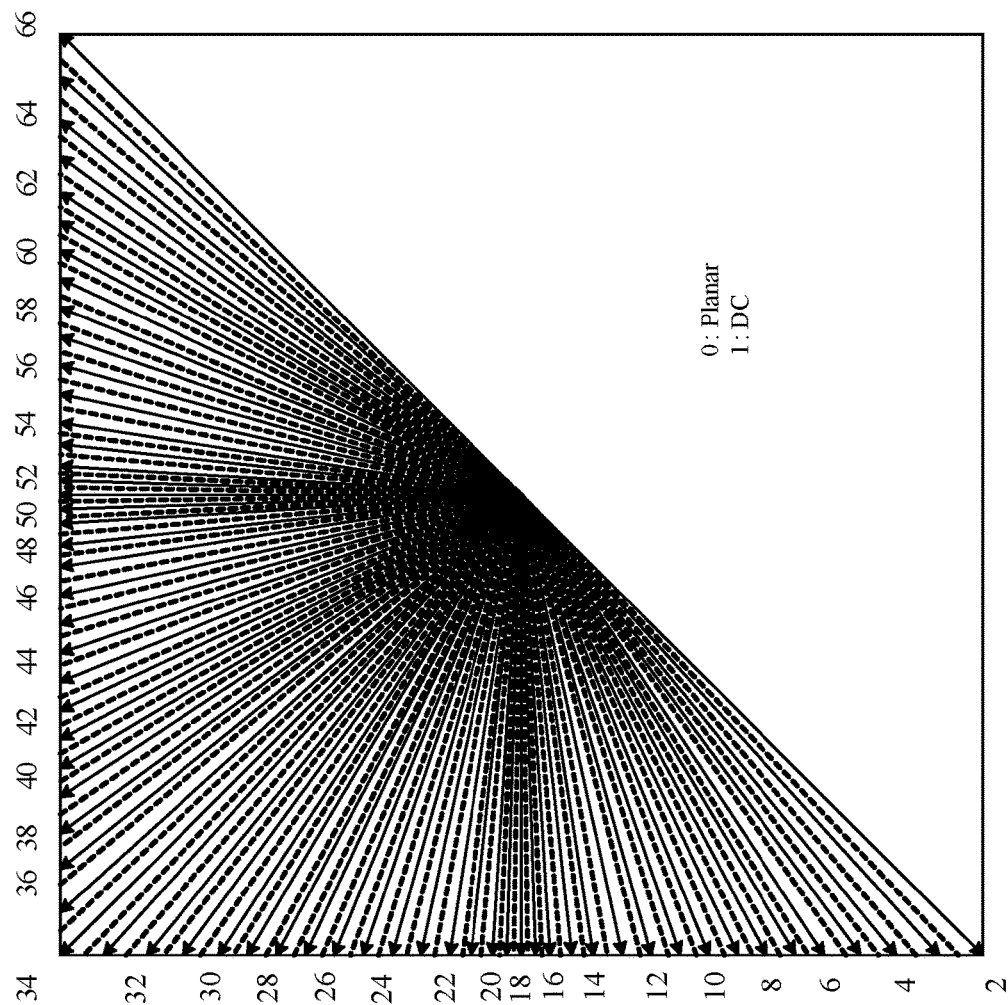
FIG. 23 is a schematic diagram of intra mode coding with greater than 67 intra-prediction modes to capture the arbitrary edge directions presented in natural video in accordance with some aspects of the present disclosure.

FIG. 23 is a schematic diagram 2300 of intra mode coding with greater than 67 intra-prediction modes to capture the arbitrary edge directions presented in natural video. In some examples, the number of directional intra modes may be extended from 67, as used in VVC, to 129 while the planar and the DC modes remain the same.

In one example, the pre-defined IPMs may be the IPMs have denser directions than conventional IPMs (e.g., IPMs denoted by the dashed lines in FIG. 23). In one example, the N1 IPMs may be partial or full of the MPMs for the current block. In one example, some pre-defined intra-prediction modes which are not in MPMs may also be contained in the given IPM candidate set.

In one example, one or more IPMs from DC/Planar/horizontal/vertical/diagonal top-right/diagonal bottom-left/diagonal top-left modes may be contained in the given IPM set.

In one example, one or more IPMs denoted by the dashed lines in FIG. 23 may be contained in the given IPM set.

In one example, N1 may be equal to or larger than N2 when one or more IPMs denoted by the dashed red lines are contained in the given IPM set.

In one example, N1 may be equal to or larger than N2.

FIGS. 24-31 illustrate examples of templates that may be formed from one or more sub-templates. As discussed in further detail below, the template for a block may be selected for the specific block. For instance, the template may be selected based on decoded information about the specific block or based on availability of the sub-templates for the specific block. Although several examples are illustrated, other templates may be selected based on different combinations of the sub-templates.

FIG. 24 is a diagram of an example of a template 2400 including a left-above sub-template 2420 (Template-LA). The template 2400 may be selected for a block 2410, which may have dimensions of M samples horizontally and N samples vertically. The left-above sub-template 2420 may include left-above neighboring samples that are located both to the left of the block 2410 and above the block 2410. The left-above sub-template 2420 may have dimensions of L1 samples horizontally and L2 samples vertically. L1 and L2 may be defined for the block 2410, a slice including the block 2410, or a picture including the block 2410.

FIG. 25 is a diagram of an example of a template 2500 including a left sub-template 2440 (Template-L) and an above sub-template 2430 (Template-A). The template 2500 may be selected for a block 2410, which may have dimensions of M samples horizontally and N samples vertically. The left sub-template 2440 may include samples located to the left of the block 2410. The left sub-template 2440 may be adjacent the top edge of the block 2410. The left sub-template 2440 may have dimensions of L1 samples horizontally and N samples vertically. The above sub-template 2430 may include samples located above the block 2410. The above sub-template 2430 may be adjacent the top edge of the block 2410. The above sub-template 2430 may have dimensions of M samples horizontally and L2 samples vertically.

Figure 26:
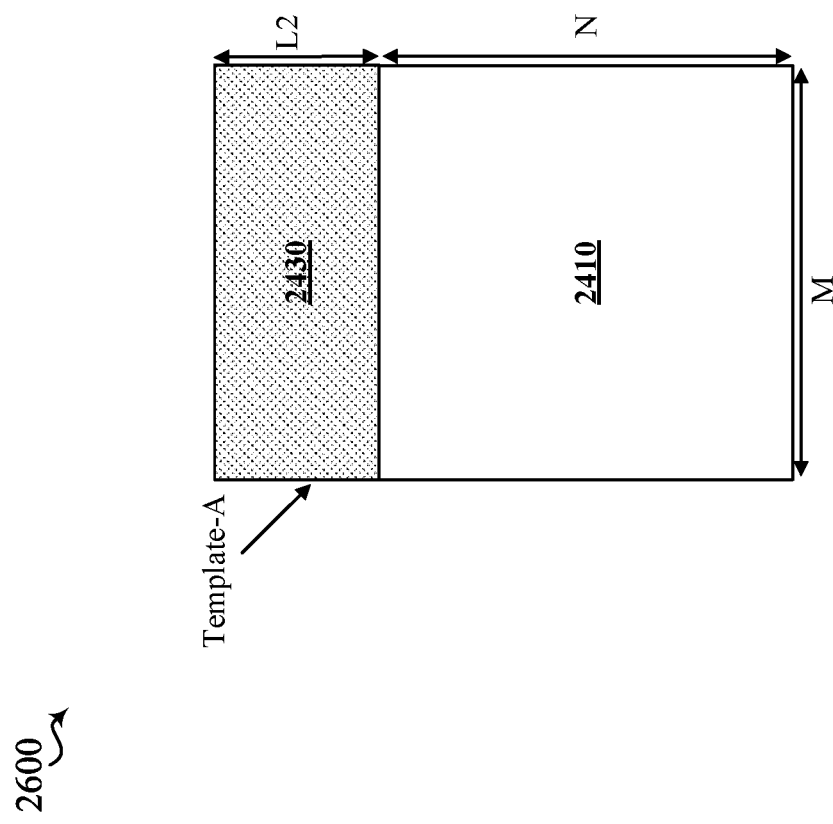
FIG. 26 is a diagram of an example template including an above sub-template in accordance with some aspects of the present disclosure.

FIG. 26 is a diagram of an example of a template 2600 including the above sub-template 2430 (Template-A). The template 2600 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically.

Figure 27:
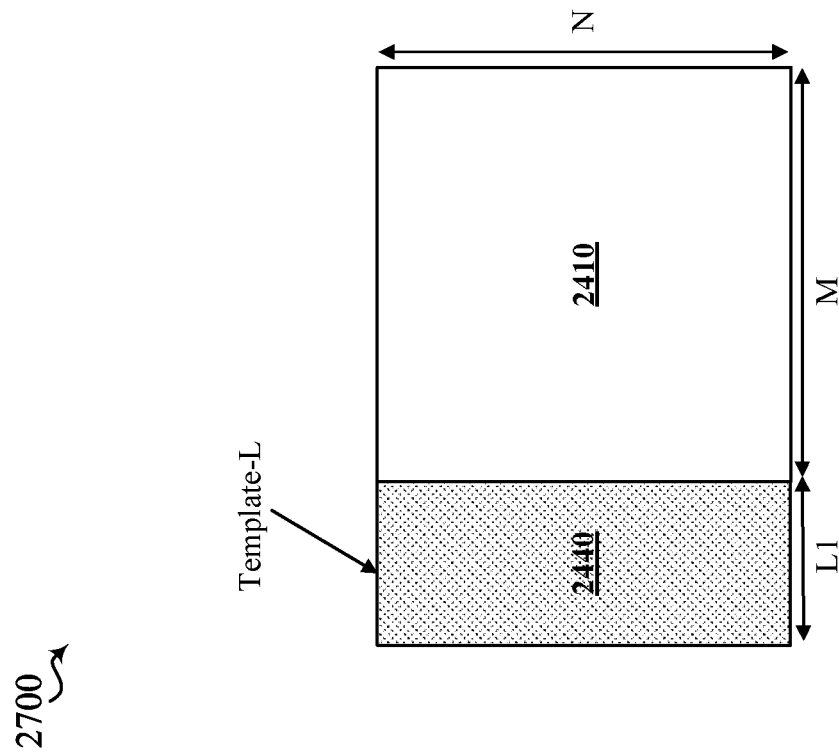
FIG. 27 is a diagram of an example template including a left sub-template in accordance with some aspects of the present disclosure.

FIG. 27 is a diagram of an example of a template 2700 including a left sub-template (Template-L). The template 2700 may be selected for a block 2410, which may have dimensions of M samples horizontally and N samples vertically. The left sub-template 2440 may include samples located to the left of the block 2410. The left sub-template 2440 may have dimensions of L1 samples horizontally and N samples vertically.

Figures 28, 29:
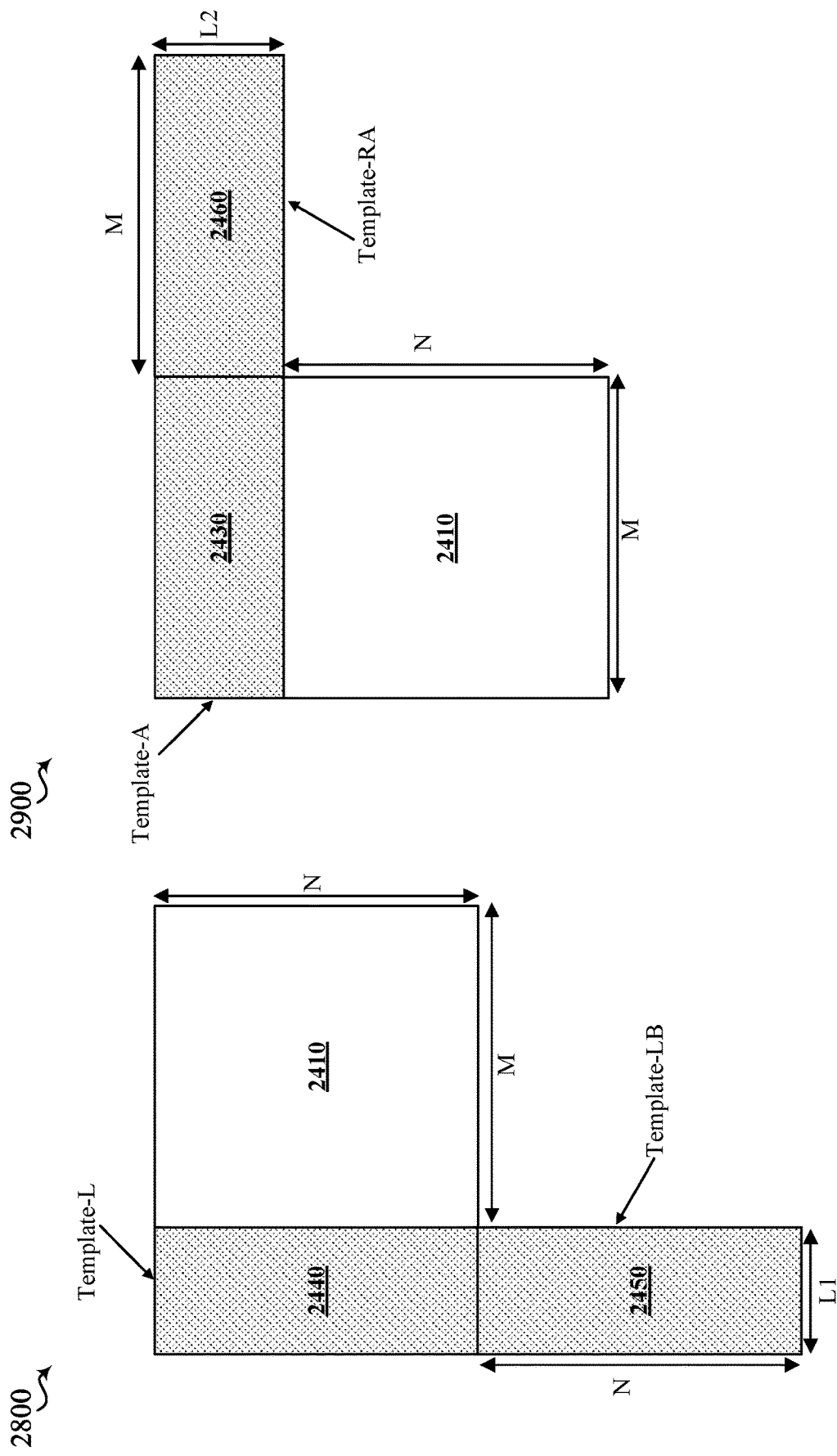
FIG. 28 is a diagram of an example template including a left sub-template and a left-below sub-template in accordance with some aspects of the present disclosure.
FIG. 29 is a diagram of an example template including an above sub-template and a right-above sub-template in accordance with some aspects of the present disclosure.

FIG. 28 is a diagram of an example of a template 2800 including the left sub-template 2440 (Template-L) and a left-below sub-template 2450 (Template-LB). The template 2800 may be selected for a block 2410, which may have dimensions of M samples horizontally and N samples vertically. The left sub-template 2440 may include samples located to the left of the block 2410. The left sub-template 2440 may have dimensions of L1 samples horizontally and N samples vertically. The left-below sub-template 2450 may include samples that are located both to the left of the block 2410 and below the block 2410. The left-below sub-template 2450 may have dimensions of L1 samples horizontally and N samples vertically.

FIG. 29 is a diagram of an example of a template 2900 including the above sub-template 2430 (Template-A) and a right-above sub-template 2460 (Template-RA). The template 2900 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The right-above sub-template 2460 may include samples located both above the block 2410 and to the right of the block 2410. The right-above sub-template 2460 may have dimensions of M samples horizontally and L2 samples vertically.

Figure 30:
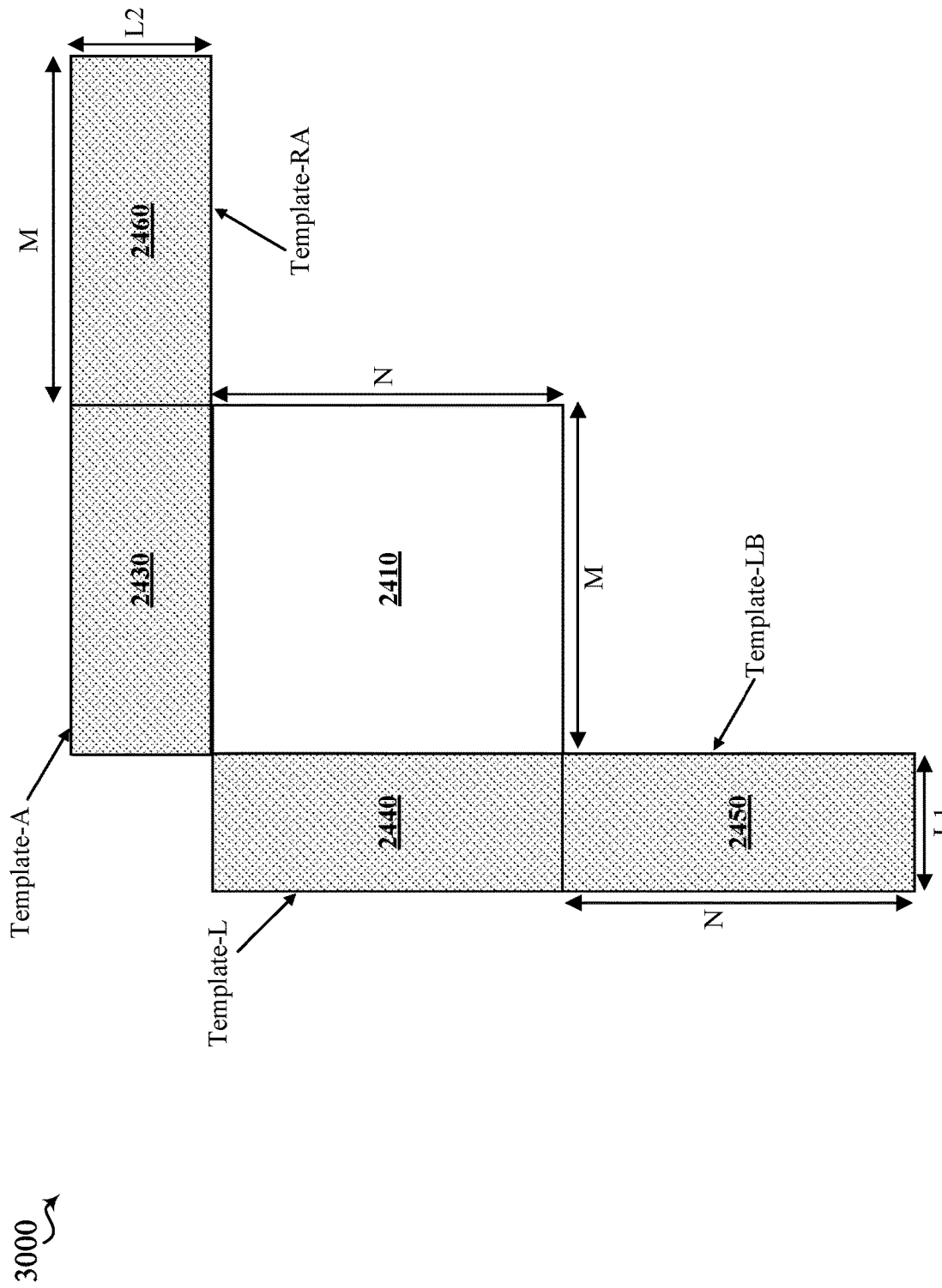
FIG. 30 is a diagram of an example template including a left sub-template, a left-below sub-template, an above sub-template, and a right-above sub-template in accordance with some aspects of the present disclosure.

FIG. 30 is a diagram of an example of a template 3000 including the left sub-template 2440, the left-below sub-template 2450, the above sub-template 2430, and the right-above sub-template 2460. The template 3000 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The right-above sub-template 2460 may include samples located above and to the right of the block 2410. The right-above sub-template 2460 may have dimensions of M samples horizontally and L2 samples vertically. The left sub-template 2440 may include samples located to the left of the block 2410. The left sub-template 2440 may have dimensions of L1 samples horizontally and N samples vertically. The left-below sub-template 2450 may include samples located to the left of the block 2410 and below the block 2410. The left-below sub-template 2450 may have dimensions of L1 samples horizontally and N samples vertically.

Figure 31:
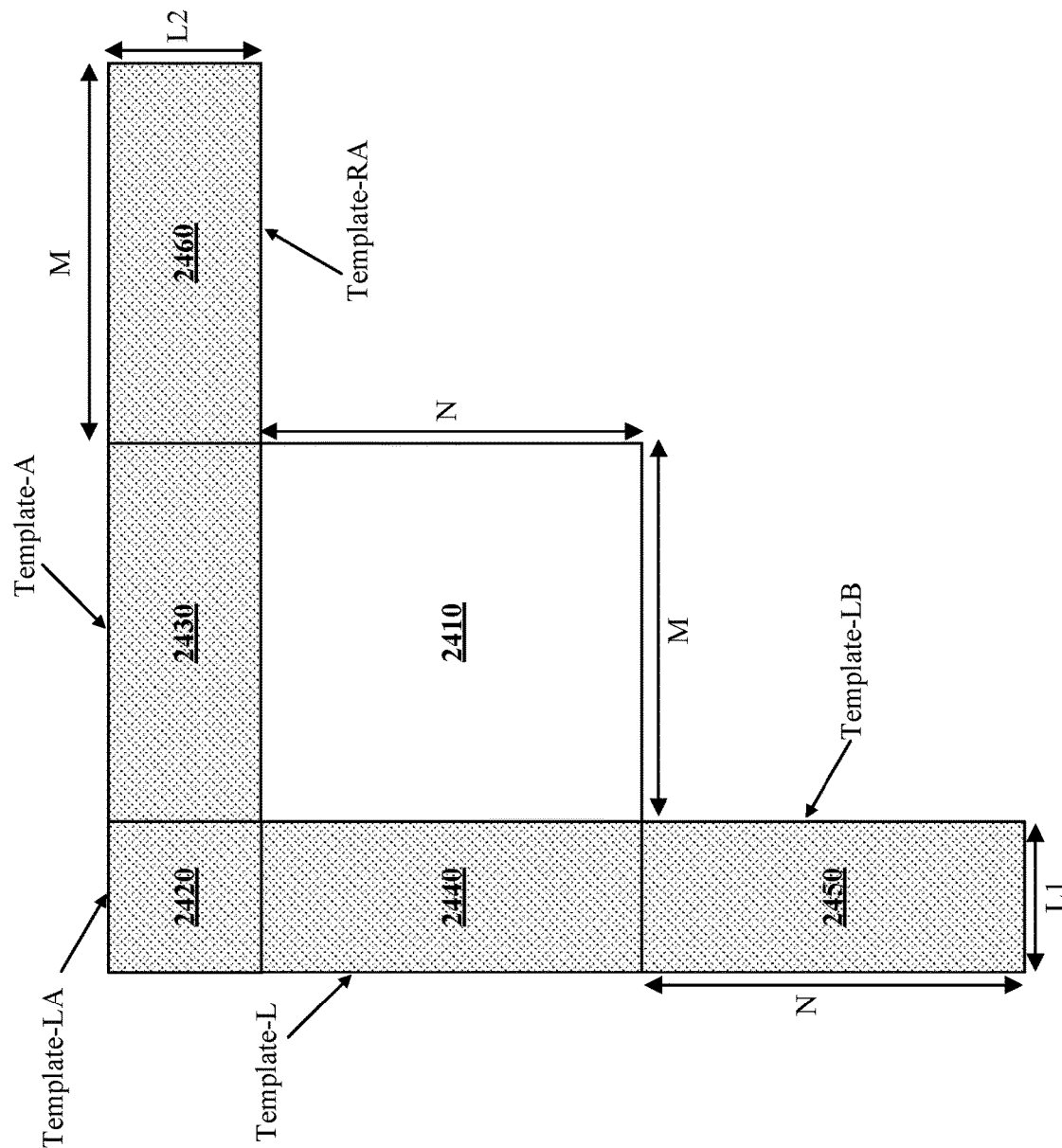
FIG. 31 is a diagram of an example template including a left-above sub-template, a left sub-template, a left-below sub-template, an above sub-template, and a right-above sub-template in accordance with some aspects of the present disclosure.

FIG. 31 is a diagram of an example of a template 3100 including the left-above sub-template 2420, the left sub-template 2440, the left-below sub-template 2450, the above sub-template 2430, and the right-above sub-template 2460. The template 3100 may be selected for a block 2410, which may have dimensions of M samples horizontally and N samples vertically. The left-above sub-template 2420 may include samples located to the left and above the block 2410. The left-above sub-template 2420 may have dimensions of L1 samples horizontally and L2 samples vertically. The above sub-template 2430 may include samples located above the block 2410. The above sub-template 2430 may have dimensions of M samples horizontally and L2 samples vertically. The right-above sub-template 2460 may include samples located above and to the right of the block 2410. The right-above sub-template 2460 may have dimensions of M samples horizontally and L2 samples vertically. The left sub-template 2440 may include samples located to the left of the block 2410. The left sub-template 2440 may have dimensions of L1 samples horizontally and N samples vertically. The left-below sub-template 2450 may include samples located to the left of and below the block 2410. The left-below sub-template 2450 may have dimensions of L1 samples horizontally and N samples vertically.

Figure 32:
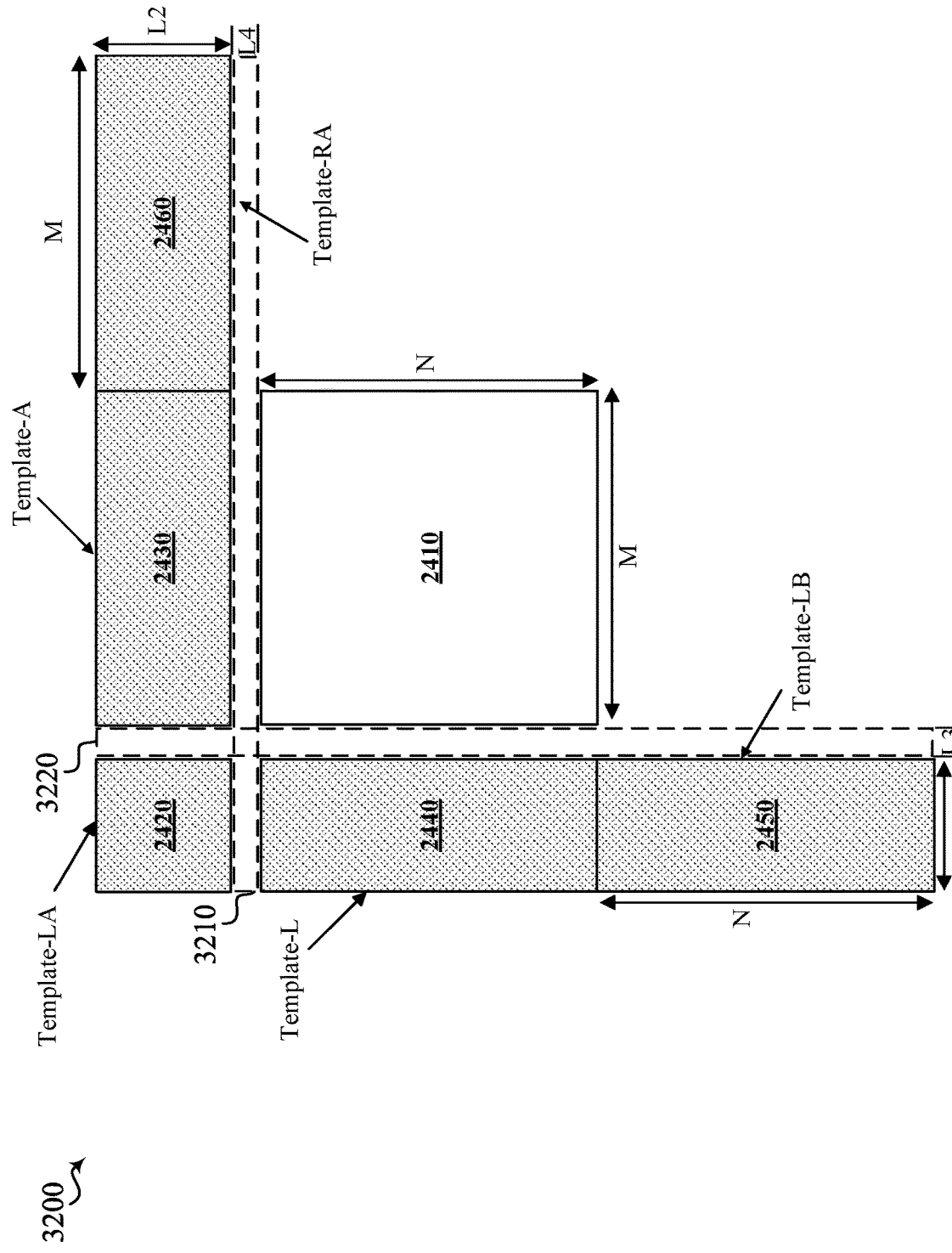
FIG. 32 is a diagram of an example template including sub-templates that are spaced apart from a target block in accordance with some aspects of the present disclosure.

FIG. 32 is a diagram of an example of a template 3200 including a left-above sub-template 2420, a left sub-template 2440, a left-below sub-template 2450, an above sub-template 2430, and a right-above sub-template 2460 that are spaced apart from a block. The example template 3200 may be selected for a block 2410, which may have dimensions of M samples horizontally and N samples vertically. In contrast to the sub-templates in FIGS. 24-31, the sub-templates in FIG. 32 may be spaced apart from the block 2410. For example, the left-above sub-template 2420, the left sub-template 2440, and the left-below sub-template 2450 may be spaced horizontally apart from the block 2410 by a gap 3220. The gap 3220 may have a horizontal dimension of L3 samples. The left-above sub-template 2420, the above sub-template 2430, and the right-above sub-template 2460 may be spaced vertically apart from the block 2410 by a gap 3210. The gap 3210 may have a vertical dimension of L4 samples. In an aspect, each of the sub-templates 2420, 2430, 2440, 2450, 2460 may have dimensions that are the same as a corresponding sub-template 2420, 2430, 2440, 2450, 2460 in FIGS. 24-31. Accordingly, in FIG. 32, the locations of the sub-templates 2420, 2430, 2440, 2450, 2460 are different, but the size of the sub-templates 2420, 2430, 2440, 2450, 2460 may be the same as in FIGS. 24-31.

Figure 33:
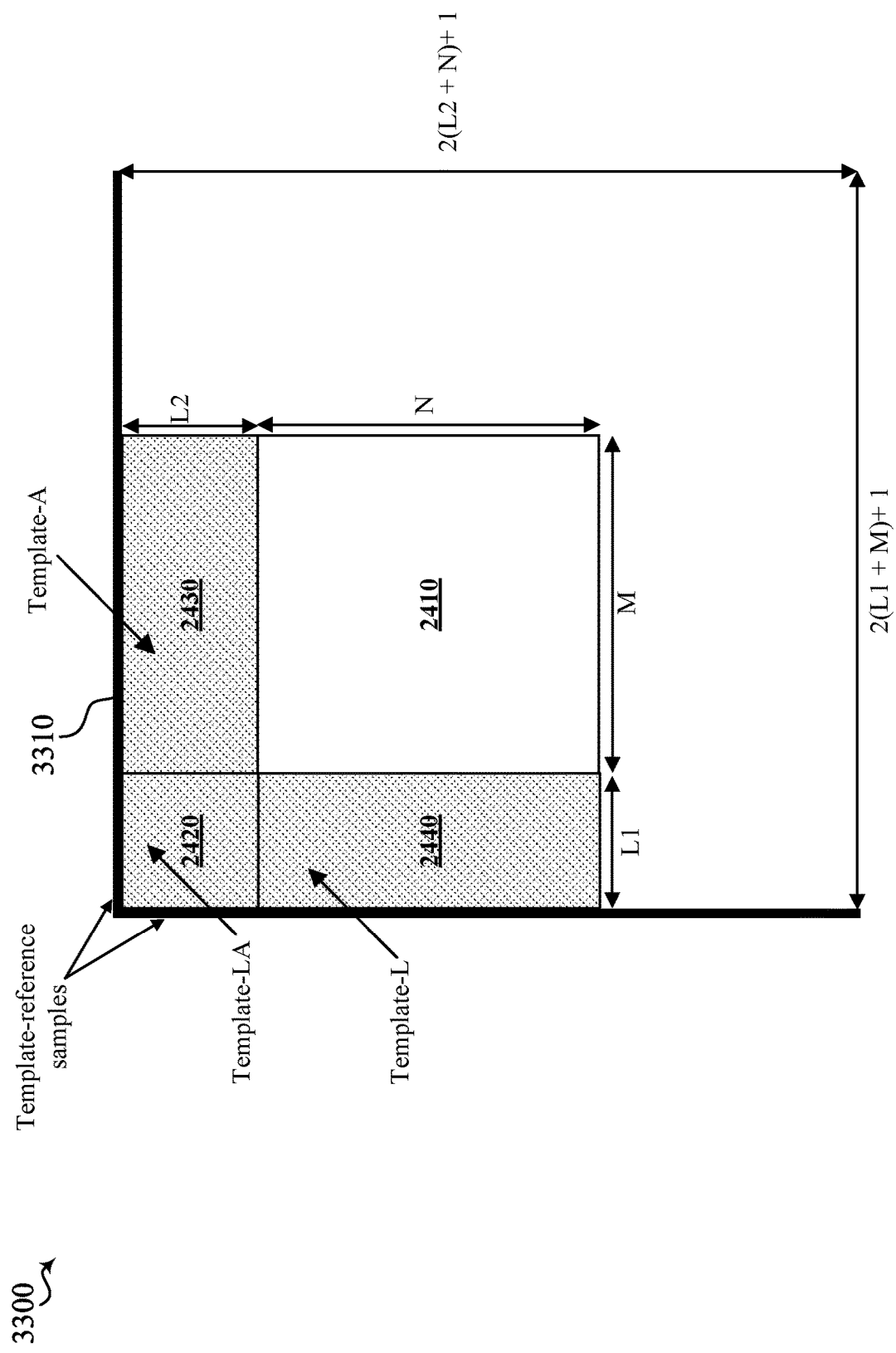
FIG. 33 is a diagram of example template-reference samples for a template including a left-above sub-template, a left sub-template, and an above sub-template in accordance with some aspects of the present disclosure.

FIG. 33 is a diagram of examples of template-reference samples 3310 for a template 3300 including a left-above sub-template 2420, a left sub-template 2440, and an above sub-template 2430. The example template 3300 may be selected for a block 2410, which may have dimensions of M samples horizontally and N samples vertically. The left-above sub-template 2420 may include samples located to the left and above the block 2410. The left-above sub-template 2420 may have dimensions of L1 samples horizontally and L2 samples vertically. The above sub-template 2430 may include samples located above the block 2410. The above sub-template 2430 may have dimensions of M samples horizontally and L2 samples vertically. The left sub-template 2440 may include samples located to the left of the block 2410. The left sub-template 2440 may have dimensions of L1 samples horizontally and N samples vertically. The template-reference samples 3310 may be a single row of samples located above the template 3300 and a single column of samples located to the left of the template 3300. The row of samples may have a length of 2(L1+M)+1. The column of samples may have a height of 2(L2+N)+1.

Figure 34:
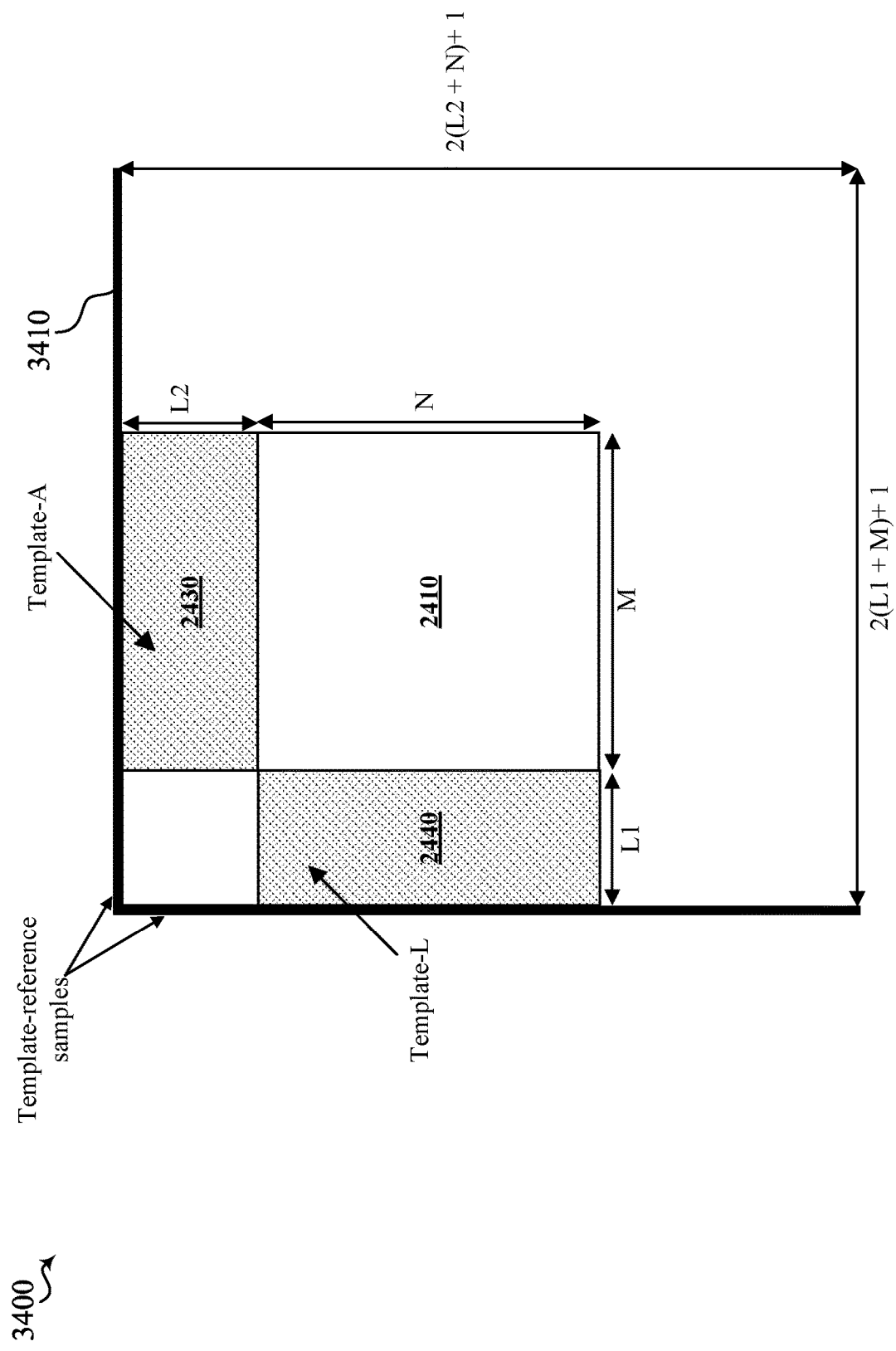
FIG. 34 is a diagram of example template-reference samples for a template including a left sub-template and an above sub-template in accordance with some aspects of the present disclosure.

FIG. 34 is a diagram of example template-reference samples 3410 for the template 2500 including the left sub-template 2440 and the above sub-template 2430. The example template 2500 may be selected for a block 2410, which may have dimensions of M samples horizontally and N samples vertically. The above sub-template 2430 may include samples located above the block 2410. The above sub-template 2430 may have dimensions of M samples horizontally and L2 samples vertically. The left sub-template 2440 may include samples located to the left of the block 2410. The left sub-template 2440 may have dimensions of L1 samples horizontally and N samples vertically. The template-reference samples may include one or more lines (e.g., rows or columns) of samples. For example, the template-reference samples 3410 may include a single row of samples located above the template 2500 and a single column of samples located to the left of the template 2500. The row of samples may have a length of 2(L1+M)+1. The column of samples may have a height of 2(L2+N)+1.

Figures 35, 36:
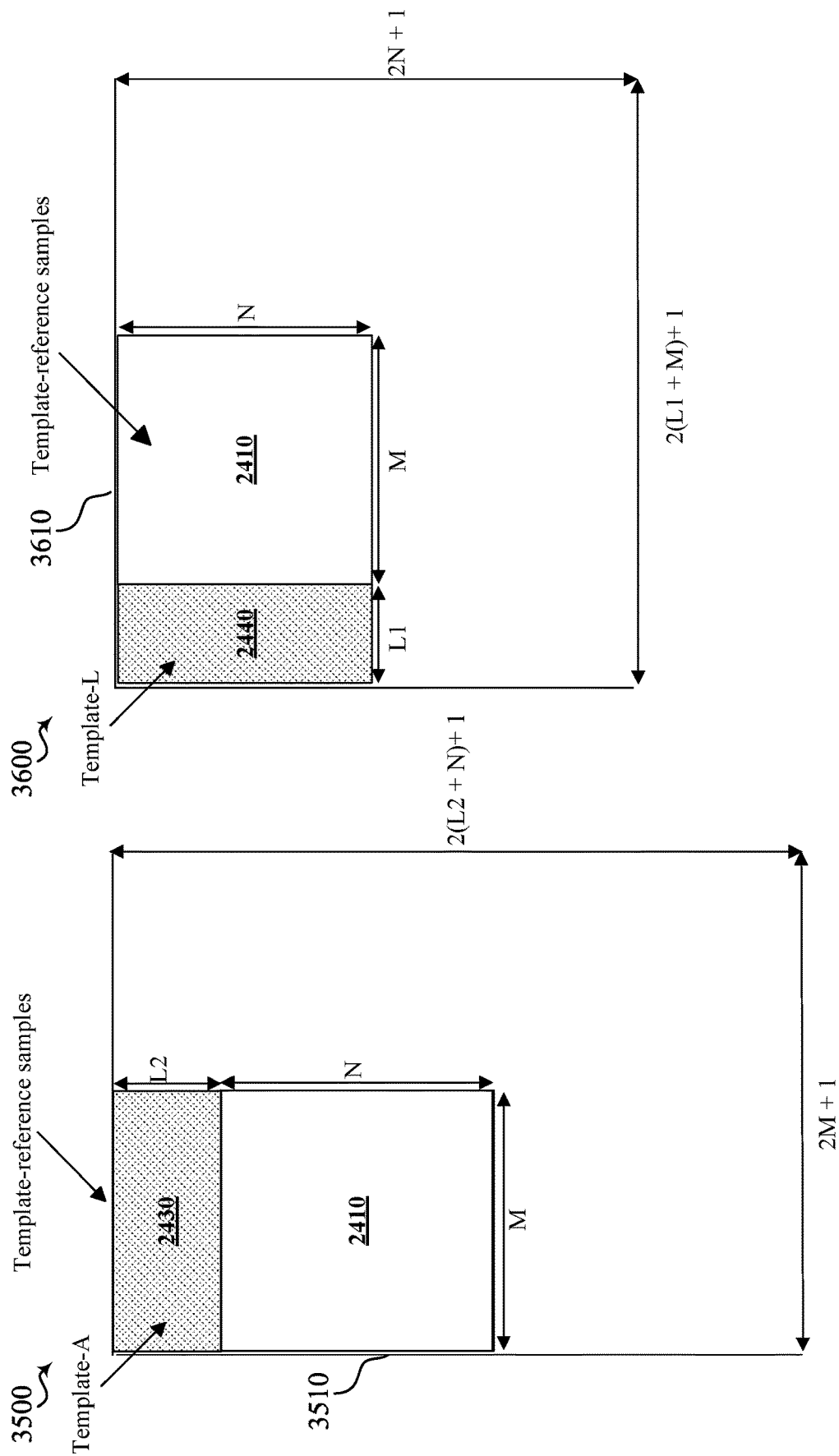
FIG. 35 is a diagram of example template-reference samples for a template including an above sub-template in accordance with some aspects of the present disclosure.
FIG. 36 is a diagram of example template-reference samples for a template including a left sub-template in accordance with some aspects of the present disclosure.

FIG. 35 is a diagram of example template-reference samples 3510 for the template 2600 including the above sub-template 2430. The template-reference samples 3510 may be a single row of samples located above the template 2600 and a single column of samples located to the left of the template 2600. The row of samples may have a length of 2M+1. The column of samples may have a height of 2(L2+N)+1.

FIG. 36 is a diagram of example template-reference samples 3610 for the template 2700 including the left sub-template 2440. The template-reference samples 3610 may be a single row of samples located above the template 2700 and a single column of samples located to the left of the template 2700. The row of samples may have a length of 2(L1+M)+1. The column of samples may have a height of 2N+1.

FIG. 37 is a diagram of example template-reference samples 3710 for the template 2600 including the above sub-template 2430. The template-reference samples 3710 may be a single row of samples located above the template 2600 and a single column of samples located to the left of the template 2600. The row of samples may have a length of 2(L1+M)+1. The column of samples may have a height of 2(L2+N)+1. Because the template 2600 does not include the left-above sub-template 2420 or the left sub-template 2440, the column of samples may be spaced from the template 2600 by a horizontal gap 3720 with a width of L1.

Figure 38:
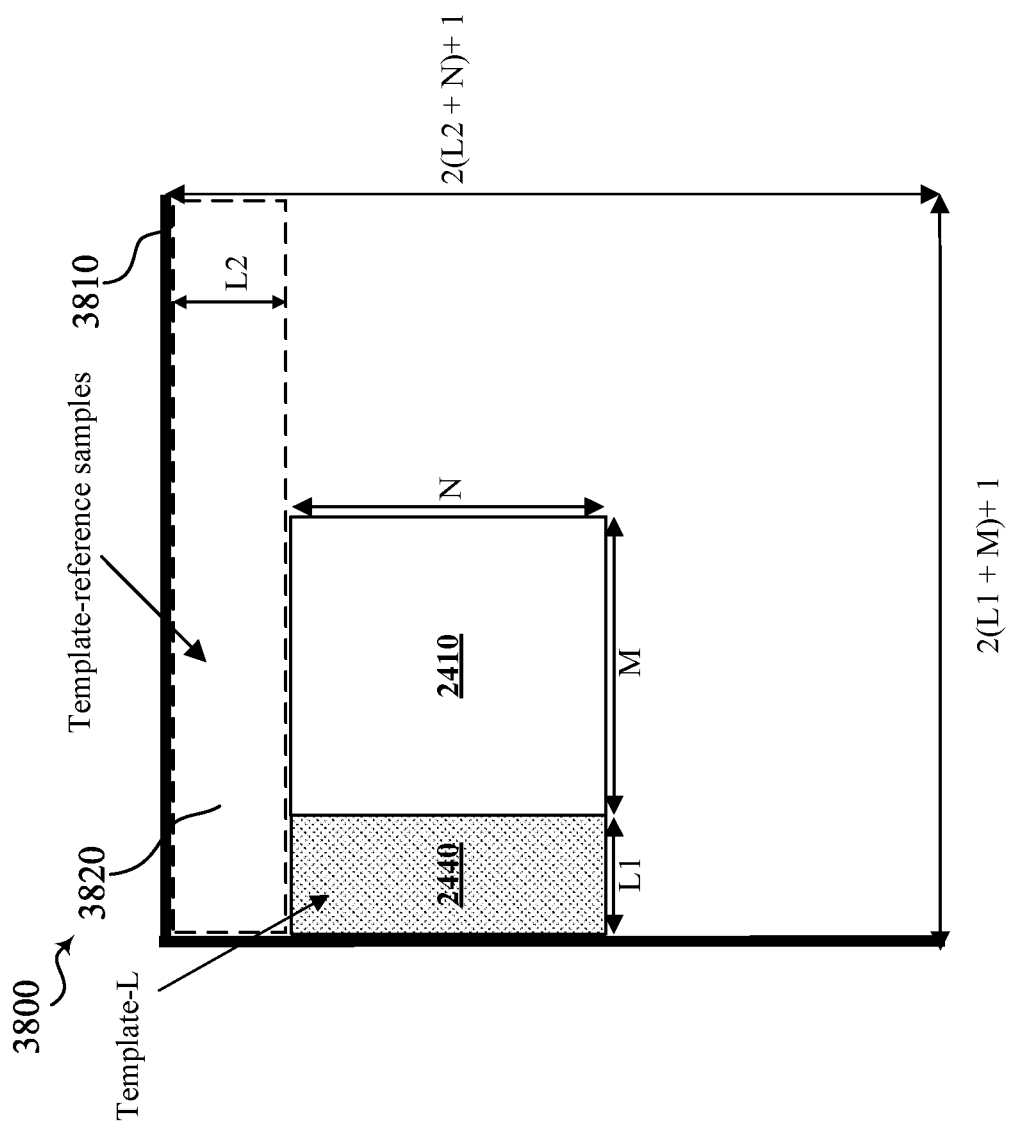
FIG. 38 is a diagram of example template-reference samples with a vertical gap for a template including an above sub-template in accordance with some aspects of the present disclosure.

FIG. 38 is a diagram of example template-reference samples 3810 for the template 2700 including the left sub-template 2440. The template-reference samples 3810 may be a single row of samples located above the template 2700 and a single column of samples located to the left of the template 2700. The row of samples may have a length of 2(L1+M)+1. The column of samples may have a height of 2(L2+N)+1. Because the template 2700 does not include the left-above sub-template 2420 or the above sub-template 2430, the row of samples may be spaced from the template 2700 by a vertical gap 3820 with a height of L2.

FIG. 39 is a diagram of example template-reference samples 3910 for the template 2500 including the above sub-template 2430 and the left sub-template 2440. The template-reference samples 3910 may include a single column of samples located to the left of the template 2500. The column of samples may have a height of 2(L2+N)+1. Instead of a single row of template-reference samples, a portion 3920 of the row may be moved to a second row 3930 that is adjacent the left sub-template 2440. The portion 3920 may include L1 samples. The remaining portion in the first row may have a length of 2M+L1+1. In an aspect, selecting template-reference samples that are adjacent a sub-template included within the template may improve the prediction of the template.

FIG. 40 is a diagram of example template-reference samples 4010 for the template 2500 including the above sub-template 2430 and the left sub-template 2440. The template-reference samples 4010 may include a single row of samples located above the template 2500. The row of samples may have a length of 2(L1+M)+1. Instead of a single column of template-reference samples, a portion 4020 of the column may be moved to a second row 4030 that is adjacent the above sub-template 2430. The portion 4020 may include L2 samples. The remaining portion in the first column may have a height of 2N+L2+1. In an aspect, selecting template-reference samples that are adjacent a sub-template included within the template may improve the prediction of the template. In another aspect, both of the portion 3920 and the portion 4020 may be moved to the second row 3930 and the second row 4030, respectively.

Figure 41:
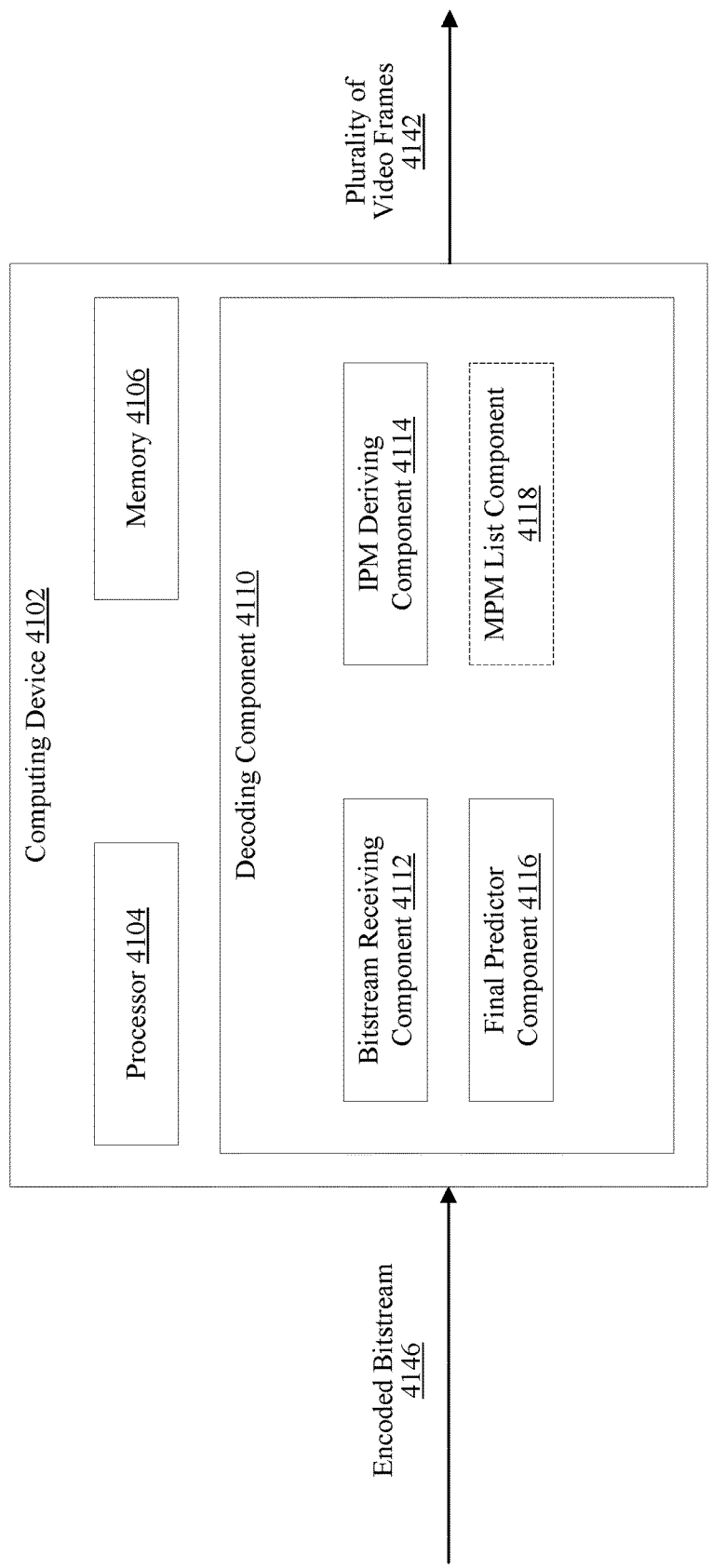
FIG. 41 is a diagram of an example video decoder in accordance with some aspects of the present disclosure.

FIG. 41 illustrates an example of a system 4100 for performing video decoding. In an aspect, decoding component 4110 can include at least one of a bitstream receiving component 4112 for receiving an encoded bitstream of one or more images or multiple images in a video, an IPM deriving component 4114 for deriving multiple IPMs for a given block or other portion of an image, a final predictor component 4116 for determining a final predictor for decoding the block or other portion of the image based on the multiple IPMs. In an example, decoding component 4110 may also optionally include a MPM list component 4118 for generating an MPM list of IPMs to use in decoding the current block or subsequent blocks of the image based on the final predictor.

Figure 42:
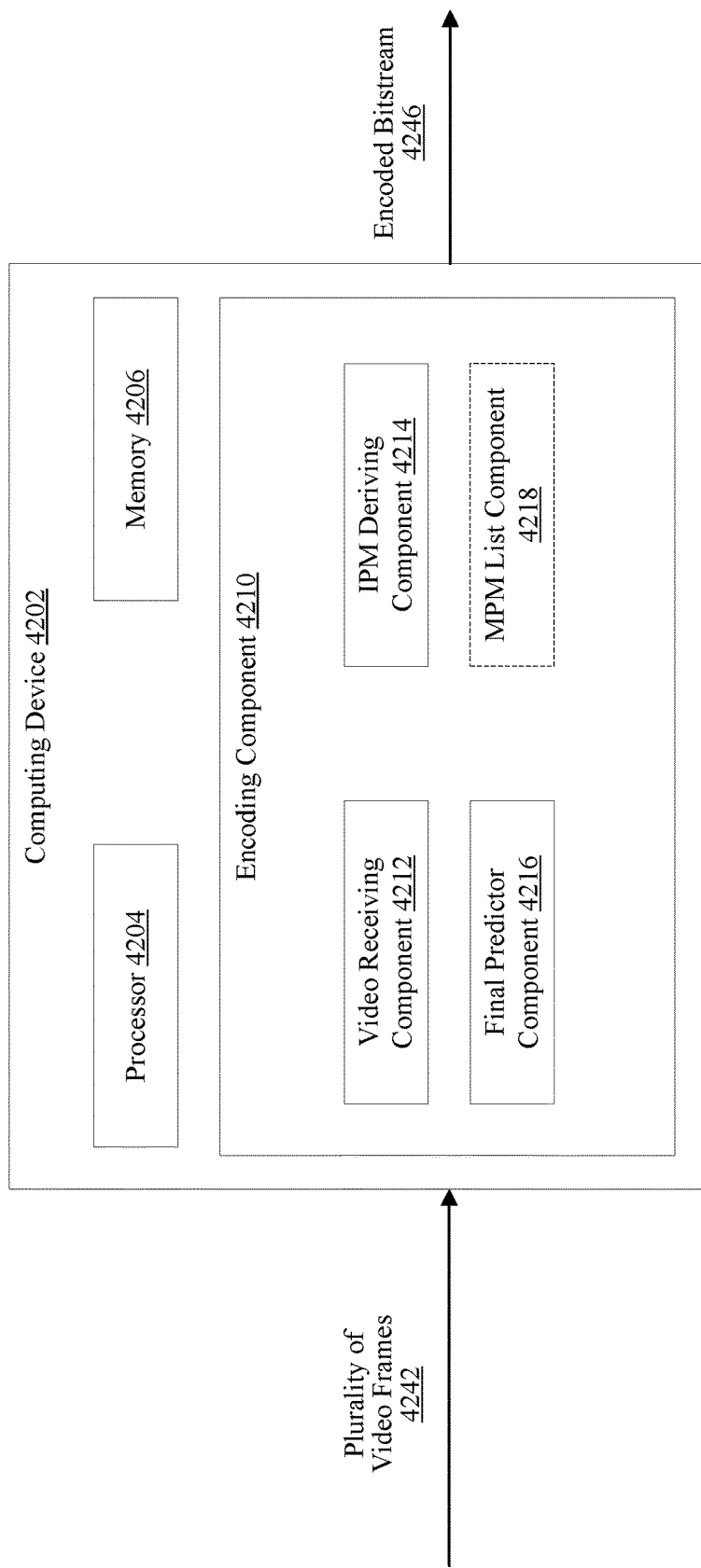
FIG. 42 is a diagram of an example video encoder in accordance with some aspects of the present disclosure.

FIG. 42 illustrates an example of a system 4200 for performing video encoding. In an aspect, encoding component 4210 can include at least one of a video receiving component 4212 for receiving one or more images or multiple images in a video, an IPM deriving component 4214 for deriving multiple IPMs for a given block or other portion of an image, a final predictor component 4216 for determining a final predictor for encoding the block or other portion of the image based on the multiple IPMs. In an example, encoding component 4210 may also optionally include a MPM list component 4218 for generating an MPM list of IPMs to use in encoding the current block or subsequent blocks of the image based on the final predictor.

Figure 43:
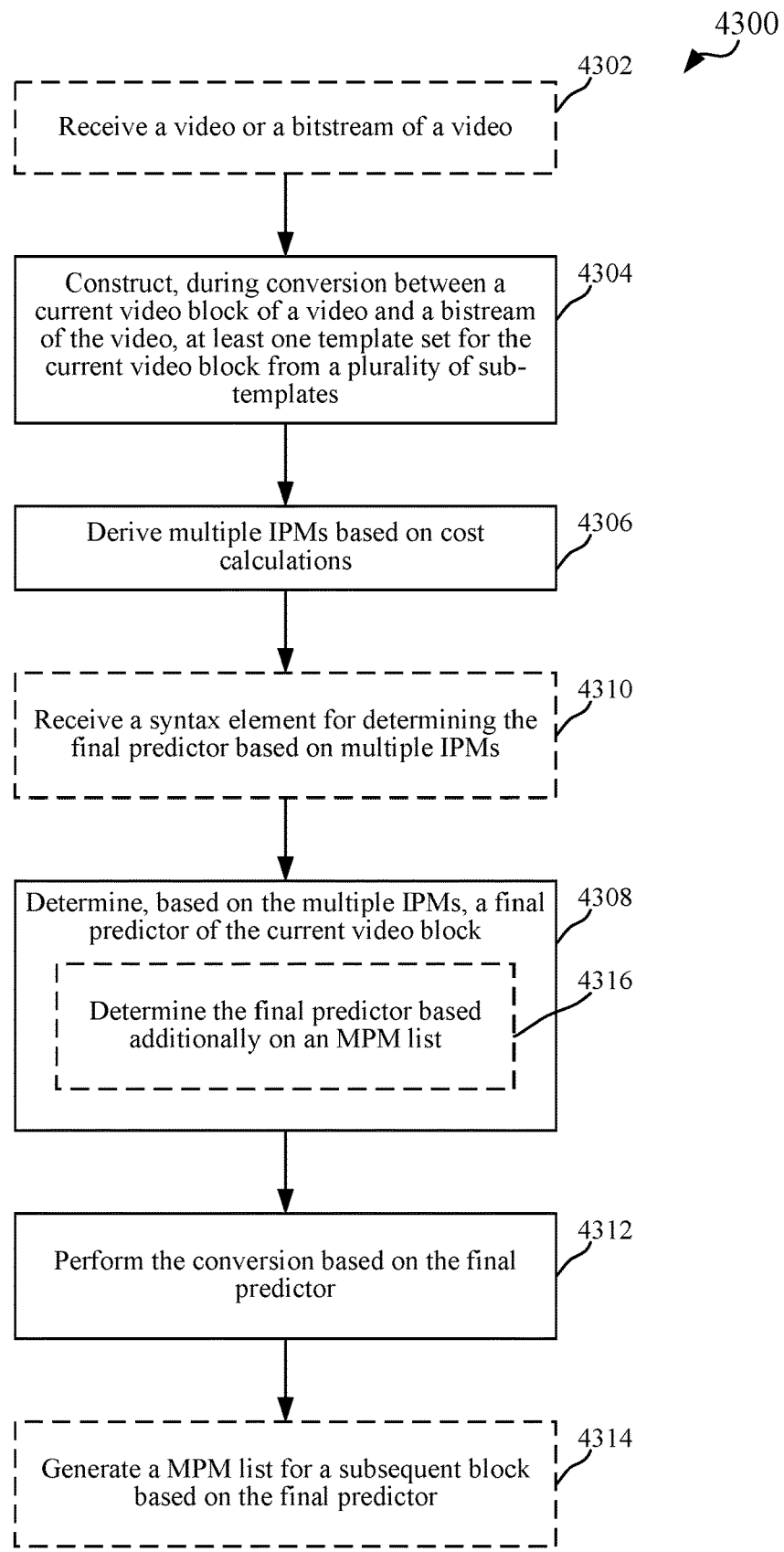
FIG. 43 is a flowchart of an example method of encoding or decoding a bitstream in accordance with some aspects of the present disclosure.

FIG. 43 illustrates an example of a method 4300 for performing video encoding or decoding based on multiple IPMs. Referring to FIGS. 41-43, in operation, computing device 4102 or 4202 may perform a method 4300 of video encoding or decoding, by such as via execution of a decoding component 4110 by a processor 4104 and/or memory 4106, an encoding component 4210 by a processor 4204 and/or memory 4206, and/or based on processor-executable instructions stored in memory 4106 or 4206. For example, decoding component 4110 can be part of or can include a video decoder 124, video decoder 300, or HEVC video encoder and decoder 400, as described above, and/or encoding component 4210 can be part of or can include a video encoder 114, video encoder 200, or HEVC video encoder and decoder 400, as described above.

Referring to FIG. 43, in method 4300, optionally at action 4302, a video or a bitstream of a video can be received. In an aspect, bitstream receiving component 4112, e.g., in conjunction with processor 4104, memory 4106, decoding component 4110, etc., can receive the bitstream of the video, which can include encoded bitstream 4146. For example, bitstream receiving component 4112 can receive the encoded bitstream 4146 from another computing device or other device or source, which can have encoded the bitstream using one or more video coding techniques, such as HEVC, VVC, etc. In an example, the encoded bitstream 4146 can include the image and/or can include one or more other images as part of a video for display on a display device or otherwise for decoding by decoding component 4110 and/or computing device 4102. In an example, decoding component 4110 can decode the encoded bitstream 4146, as descried above and further herein, to generate a plurality of video frames 4142 for display or storage.

In another aspect, video receiving component 4212, e.g., in conjunction with processor 4204, memory 4206, encoding component 4210, etc., can receive the video, which can include the plurality of video frames 4242. For example, video receiving component 4212 can receive the plurality of video frames 4242 from another computing device or other device or source for encoding. In an example, the plurality of video frames 4242 can include the image and/or can include one or more other images as part of a video for display on a display device or otherwise for encoding by encoding component 4210 and/or computing device 4202. In an example, encoding component 4210 can encode the plurality of video frames 4242, as descried above and further herein, to generate an encoded bitstream 4246 for decoding by another device or at another time.

In method 4300, at action 4304, during conversion between a current video block of a video and a bistream of the video, at least one template set for the current video block can be constructed from a plurality of sub-templates. In an aspect, decoding component 4110, e.g., in conjunction with processor 4104, memory 4106, etc., or encoding component 4210, e.g., in conjunction with processor 4204, memory 4206, etc., can construct, during conversion between a current video block of the video and the bitstream of the video, at least one template set for the current video block from a plurality of sub-templates. For example, decoding component 4110 can construct the at least one template set during conversion between the bitstream of the video and the current video block of the video in decoding the bitstream of the video into the current video block of the video. In another example, encoding component 4210 can construct the at least one template set during conversion between the current video block of the video and the bitstream of the video in encoding the the current video block of the video into the bitstream of the video. For example, decoding component 4110 or encoding component 4210 can construct the template set to include one or more of a left sub-template, an above sub-template, an above right sub-template, a left below sub-template, and a left above sub-template, as described above, for the current video block or the b.

In method 4300, at action 4306, multiple IPMs can be derived based on cost calculations. In an aspect, IPM deriving component 4114, e.g., in conjunction with processor 4104, memory 4106, decoding component 4110, etc., or IPM deriving component 4214, e.g., in conjunction with processor 4204, memory 4206, encoding component 4210, etc., can derive the multiple IPMs based on the cost calculations. For example, IPM deriving component 4114 can determine the multiple IPMs to use in decoding the block, or IPM deriving component 4214 can determine the multiple IPMs to use in encoding the block, based on one or more mechanisms used in conventional IPM derivation, as described above. In this regard, for example, the multiple IPMs can be conventional IPMs from a conventional IPM derivation process, such as one of the 67 IPMs in VCC described above.

In an example, IPM deriving component 4114 or 4214 can derive multiple (e.g., two or more IPMs) based on determining which IPMs have a smallest cost (e.g., a smallest cost calculated between predicted samples of blocks and reconstructed samples of blocks, as described). For example, IPM deriving component 4114 or 4214 can derive a number (positive integer), K, of IPMs where K>1. In one example, IPM deriving component 4114 or 4214 can derive a certain number of K smallest cost IPMs, derive any number of IPMs having cost less than a threshold, derive any number of IPMs within a threshold cost difference of a smallest cost IPM, etc. In one example, the multiple IPMs can represent IPMs that can be used to decode (or encode) the block, and decoding component 4110 can decode (or encoding component 4210 can encode) the block using a final predictor that is one of the multiple IPMs or computed based on the multiple IPMs.

For example, instead of deriving one IPM, aspects described herein relate to deriving two or more IPMs. Suppose the number of the derived IPMs as K, K is an integer and K is larger than 1. In one example, IPM deriving component 4114 or 4214 can derive the K IPMs by using the same templates, as described above. For example, IPM deriving component 4114 or 4214 can derive the K IPMs with smallest costs where a cost is calculated between the predicted samples and the reconstructed samples of the template for a IPM in the given IPM candidate set. In one example, IPM deriving component 4114 or 4214 can derive the K IPMs using different templates. For example, where the ith IPMs are derived from ith template sets, where i=1, 2, ..., K and a template set may be composed of one or more of Template-L, Template-A, Template-RA, Template-LB, or Template-LA, for any two different number i and j from 1 to K, the templates in the ith template set can be different the templates in the jth template set. In another example, the templates in the ith template set may be same as the templates in the jth template set where i,j=1, 2, ..., K and i is not equal to j. In one example, there may be at least two different template sets whose templates are different. In one example, IPM deriving component 4114 or 4214 can derive two or more IPMs from a same template set and can derive other IPMs from one or more different template sets.

In method 4300, at action 4308, a final predictor of the current video block can be determined based on the multiple IPMs. In an aspect, final predictor component 4116, e.g., in conjunction with processor 4104, memory 4106, decoding component 4110, etc., or final predictor component 4216, e.g., in conjunction with processor 4204, memory 4206, encoding component 4210, etc., can determine, based on the multiple IPMs, the final predictor of the current video block. For example, final predictor component 4116 or 4216 can determine the final predictor to be one of the multiple IPMs, which may be conventional IPMs, as described, or can generate or calculate the final predictor based on the multiple IPMs, which may be conventional IPMs, as described.

In one example, which one of the derived K IPMs is used for current block may be signaled with a syntax element. Thus, in method 4300, optionally at action 4310, a syntax element for determining the final predictor based on multiple IPMs can be received. In an aspect, final predictor component 4116, e.g., in conjunction with processor 4104, memory 4106, decoding component 4110, etc., or final predictor component 4216, e.g., in conjunction with processor 4204, memory 4206, encoding component 4210, etc., can receive (e.g., in the bitstream or associated assistance information, metadata, etc.) the syntax element for determining the final predictor based on the multiple IPMs. In this example, final predictor component 4116 or 4216 can determine the syntax element from information received with the encoded bitstream 4146 (or to be included with encoded bitstream 4246) or with assistance information received with the encoded bitstream 4146 (or to be included with encoded bitstream 4246), where the syntax element can indicate which of multiple derived IPMs to use in decoding, or used in encoding, the block (e.g., indicated as an index of the multiple derived IPMs or other instructions for determining an IPM from the multiple IPMs).

In one example, the syntax element may be binarized with fixed length coding, or truncated unary coding, or unary coding, or EGk coding, or coded as a flag. In one example, the syntax element may be bypass coded. Thus, for example, final predictor component 4216 can encode the syntax element to indicate which of the multiple IPMs to use as the final predictor, or final predictor component 4116 can decode or interpret the syntax element to determine which of the multiple IPMs to use as the final predictor. Alternatively, in one example, the syntax element may be context coded. In any case, the coded syntax element may be part of the encoded bitstream 4146 or 4246 or other information and/or can be indicated in such a way to convey one or more blocks of the image to which the syntax element relates. In one example, a mechanism used to signal the syntax element may depend on the decoded (or encoded) information, such as block dimension of the block of the image (e.g., a number of pixels in a vertical and horizontal direction), block shape of the block of the image (e.g., square or rectangular), slice/picture type of a slice of the image (e.g., I-slice, B-slice, or P-slice), etc.

In another example, which one of the derived K IPMs is used for current block may be implicitly derived. In one example, final predictor component 4116 or 4216 can implicitly derive the final predictor based on decoded information such as block shape of the block of the image (e.g., square or rectangular). Suppose the block width and height of the block of the image as BW and BH; for example, IPM deriving component 4114 or 4214 can derive IPM A from Template-L and IPM B from Template-A. In this example, final predictor component 4116 or 4216 can use IPM A as the final predictor when BW is less than or equal to BH or can use IPM B as the final predictor when BW is larger than BH.

In another example, final predictor component 4116 or 4216 can use more than one IPM (denoted as H) from the derived K IPMs in the current block and the final predictor of current block may be generated using H predictors derived using these H IPMs. In one example, based on the derived IPMs, which may be conventional IPMs, final predictor component 4116 or 4216 can determine a weighted summed (combined) of the H predictors, which may be used to derive the final predictor for the current block, where H is an integer and larger than 1. In one example, H=2 or H=3. In another example, final predictor component 4116 or 4216 can determine the final predictor for the current block using one or more IPM from H IPMs and one or more default IPMs, where the default IPM may be any IPM, such as the planar, DC, horizontal mode, vertical mode, diagonal top-right mode, diagonal bottom-left mode, diagonal top-left mode, etc. In one example, the default IPMs may be signaled with a syntax element, as described above. In one example, final predictor component 4116 or 4216 can determine the final predictor of current block from one or more default IPMs alone. In one example, final predictor component 4116 or 4216 can determine any weights for deriving the final predictor of current block based on block dimension, block shape, numbers of the template, etc.

In method 4300, at action 4312, the conversion can be performed based on the final predictor. In an aspect, decoding component 4110, e.g., in conjunction with processor 4104, memory 4106, etc., can perform the conversion based on the final predictor. As described, for example, decoding component 4110 can decode the bitstream of the video into the current video block of the video based on the final predictor. In one example, decoding component 4110 can use DIMD or other suitable video decoding processes to decode blocks of the image based on an IPM or determined final predictor determined based on neighboring reconstructed samples of a current block in this regard. In another aspect, encoding component 4210, e.g., in conjunction with processor 4204, memory 4206, etc., can perform the conversion based on the final predictor. As described, for example, encoding component 4210 can encode the current video block of the video into the encoded bitstream of the video based on the final predictor. In one example, decoding component 4110 can use HEVC, VVC, or other suitable video encoding processes to encode blocks of the video based on an IPM or determined final predictor determined based on neighboring reconstructed samples of a current block in this regard. In additional examples, the final predictor may be used with an MPM list in decoding (or encoding) a current or subsequent block. The decoded blocks can be used to produce the plurality of video frames 4142, or the encoded blocks can be used to produce encoded bitstream 4246.

In one example, in method 4300, optionally at action 4314, a MPM list for a subsequent block can be generated based on the final predictor. In an aspect, final predictor component 4116, e.g., in conjunction with processor 4104, memory 4106, decoding component 4110, etc., can generate the MPM list for the subsequent block based on the final predictor, and decoding component 4110 can use the MPM list in decoding the subsequent block, as described above and further herein. In another aspect, final predictor component 4216, e.g., in conjunction with processor 4204, memory 4206, encoding component 4210, etc., can generate the MPM list for the subsequent block based on the final predictor, and encoding component 4210 can use the MPM list in encoding the subsequent block, as described above and further herein. For example, final predictor component 4116 or 4216 can determine to include the final predictor in the MPM list, where the MPM list may not include the final predictor. In another example, final predictor component 4116 or 4216 can determine a conventional IPM to include the MPM list based on the final predictor.

For example, final predictor component 4116 or 4216 can use the final predictor in the derivation of MPM list construction when parsing the subsequent blocks in decoding (or encoding) order. In one example, the final predictor may be regarded as a conventional IPM and used in the derivation of MPM list when the final predictor is one of the conventional IPM candidate set. For example, when the conventional IPM candidate set consist of X IPMs (e.g., 67 IPMs in VVC) and the final predictor is one of X IPMs, final predictor component 4116 or 4216 can use the final predictor directly to construct the MPM list same as the MPM list construction in VVC. Alternatively, for example, when the final predictor is not one of the conventional IPM candidate set, final predictor component 4116 or 4216 can convert the final predictor to one of the conventional IPMs and used in the derivation of MPM list. Alternatively, for example, final predictor component 4116 or 4216 may not use the final predictor in the derivation of MPM list.

In another example, final predictor component 4116 or 4216 can replace the final predictor by a pre-defined IPM (e.g., mode Y) in the derivation of MPM list when parsing the subsequent blocks in decoding order. In one example, mode Y may be DC, Planar, horizontal degree mode, vertical degree mode, diagonal top-right degree mode, diagonal bottom-left mode, diagonal top-left mode, etc. In one example, whether final predictor component 4116 or 4216 uses the final predictor or not in the derivation of MPM list may depend on the decoded information such as slice/picture type, or indicated by a signaled syntax element, etc. In one example, final predictor component 4116 or 4216 can use the final predictor in the derivation of MPM list for I-slice, or may not use the final predictor in the derivation of MPM list for PB slices.

In one example, in determining the final predictor at action 4308, optionally at action 4316, the final predictor can be determined based additionally on an MPM list. In an aspect, final predictor component 4116, e.g., in conjunction with processor 4104, memory 4106, decoding component 4110, etc., or final predictor component 4216, e.g., in conjunction with processor 4204, memory 4206, encoding component 4210, etc., can determine the final predictor based additionally on an MPM list. For example, given an MPM list for the current block, as described, above, final predictor component 4116 or 4216 can use the final predictor derived from the multiple IPMs in determining to use the final predictor based on an MPM list or one of the conventional IPMs in the MPM list. For example, as described in further detail below, it may be possible that the MPM list includes the final predictor, whether or not the final predictor is a conventional IPM. In this example, final predictor component 4116 or 4216 can determine to use the final predictor for the block (e.g., for decoding or encoding the block) based on the MPM list. In other examples, final predictor component 4116 or 4216 can use the final predictor determined from the multiple IPMs to select an IPM from the MPM list as the final predictor to use for the block (e.g., for decoding or encoding the block).

In an example, final predictor component 4116 or 4216 can use the final predictor to construct the MPM list of the current block. In one example, the derived IPM may be treated as an MPM and final predictor component 4116 or 4216 can insert the final predictor into the MPM list. In one example, final predictor component 4116 or 4216 can add the final predictor to the MPM list and before all other MPMs in the MPM list (e.g., at the beginning of the list) constructed using the conventional MPM list construction described above. Alternatively, furthermore, final predictor component 4116 or 4216 can increase the MPM list size by 1 to add the final predictor. In one example, final predictor component 4116 or 4216 can add the final predictor to the MPM list and after all other MPMs in the MPM list (e.g., at the end of the list) constructed using the conventional MPM list construction described above. Alternatively, furthermore, final predictor component 4116 or 4216 can increase the MPM list size by 1 to add the final predictor. In one example, final predictor component 4116 or 4216 can add the final predictor to replace one MPM in the MPM list constructed using the conventional MPM list construction described above. Alternatively, furthermore, the MPM list size may be kept unchanged.

In one example, final predictor component 4116 or 4216 may not add the final predictor to the MPM list, and instead may use the final predictor to reorder the remaining IPMs excluding MPMs. In one example, final predictor component 4116 or 4216 can regard the final predictor as a conventional IPM and may use the final predictor in the derivation of MPM list when the derived IPM is one of the conventional IPM candidate set. In one example, when the conventional IPM candidate set consist of X IPMs (i.e., 67 IPMs in VVC) and the final predictor is one of X IPMs, final predictor component 4116 or 4216 can directly use the final predictor to construct the MPM list same or similar as the MPM list construction in VVC. Alternatively, when the derived IPM is not one of the conventional IPM candidate set, final predictor component 4116 or 4216 can convert the final predictor to one of the conventional IPMs and use the conventional IPM in the derivation of MPM list.

In various examples, the disclosed methods above may be signaled at sequence level, picture level, slice level, tile group level, such as in sequence header, picture header, SPS, VPS, DPS, DCI, PPS, APS, slice header, tile group header, etc. In other various examples, the disclosed methods above may be signaled at PU, TU, CU, VPDU, CTU, CTU row, slice, tile, sub-picture, etc. In other various examples, the disclosed methods above may be dependent on coded information, such as block size, color format, single/dual tree partitioning, colour component, slice/picture type, etc.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following clauses describes some embodiments and techniques.

1. A method of processing video data, comprising:
constructing, during a conversion between a current video block of a video and a bitstream of the video, at least one template set for the current video block from a plurality of sub-templates;
deriving multiple intra-prediction modes (IPMs) based on cost calculations; determining, based on the multiple IPMs, a final predictor of the current video block; and performing the conversion based on the final predictor;
wherein the plurality of sub-templates includes a left sub-template, an above sub-template, an above right sub-template, a left below sub-template, and a left above sub-template.

2. The method of clause 1, wherein deriving the multiple IPMs includes deriving at least two IPMs for the current video block based on a same template set.

3. The method of clause 2, wherein deriving the multiple IPMs includes deriving the at least two IPMs for the current video block based on determining that the at least two IPMs have a smallest cost of a set of possible IPMs for the current video block.

4. The method of clause 1, wherein deriving the multiple IPMs includes deriving at least one IPMs for the current video block based on a first template set and deriving other IPMs for the current video block based on at least one template set different from the first template sets.

5. The method of clause 1, wherein determining the final predictor includes determining one of the multiple IPMs as a final IPM to determine the final predictor.

6. The method of clause 5, wherein determining the final predictor further includes determining a syntax element related to the final IPM is present in the bitstream of the video, and wherein the syntax element is binarized with fixed length coding, or truncated unary coding, or unary coding, or EG coding, or coded as a flag.

7. The method of clause 6, wherein the syntax element is bypass coded or context coded.

8. The method of clause 6, wherein determining a syntax element related to the final IPM is present in the bitstream is further based on at least one of a block dimension of the current video block, block shape of the current video block, or a slice type corresponding to a slice of the current video block.

9. The method of clause 5, wherein determining the one of the multiple IPMs as the final IPM is based on at least one of a block dimension of the current video block, block shape of the current video block, or a slice type corresponding to a slice of the current video block.

10. The method of clause 9, wherein determining the one of the multiple IPMs as the final IPM includes determining a first one of the multiple IPMs when a width of the current video block is less than or equal to a height of the current video block or determining a second one of the multiple IPMs when the width of the current video block is greater than the height of the current video block.

11. The method of clause 1, wherein determining the final predictor includes selecting H IPMs from the multiple IPMs to generate H intermediate predictors, wherein H is greater than one.

12. The method of clause 11, wherein generating the final predictor further includes performing a weighted sum of the H intermediate predictors.

13. The method of clause 12, further comprising determining one or more weights for performing the weighted sum based on at least one of a block dimension of the current video block, block shape of the current video block, or numbers of a sub-template.

14. The method of clause 1, wherein generating the final predictor is based on at least one of the multiple IPMs or one or more default IPMs.

15. The method of clause 14, wherein the one or more default IPMs include at least one of a planar mode, a DC mode, a horizontal mode, a vertical mode, a diagonal top-right mode, a diagonal bottom-left mode, or a diagonal top-left mode.

16. The method of clause 14, further comprising determining a syntax element related to the one or more default IPMs is presented in the bitstream.

17. The method of clause 1, wherein the conversion includes decoding the current video block from the bitstream.

18. The method of clause 1, wherein the conversion includes encoding the current video block into the bitstream.

19. An apparatus for processing video data comprising a processor and a non-transitory memory with instructions thereon, wherein the instructions upon execution by the processor, cause the processor to:
construct, during a conversion between a current video block of a video and a bitstream of the video, at least one template set for the current video block from a plurality of sub-templates;
derive multiple intra-prediction modes (IPMs) based on cost calculations;
determine, based on the multiple IPMs, a final predictor of the current video block; and perform the conversion based on the final predictor;
wherein the plurality of sub-templates includes a left sub-template, an above sub-template, an above right sub-template, a left below sub-template, and a left above sub-template.

20. A non-transitory computer-readable recording medium storing a bitstream of a video which is generated by a method performed by a video processing apparatus, wherein the method comprises:
constructing, during a conversion between a current video block of a video and a bitstream of the video, at least one template set for the current video block from a plurality of sub-templates;
deriving multiple intra-prediction modes (IPMs) based on cost calculations;

determining, based on the multiple IPMs, a final predictor of the current video block; and generating the bitstream from the current block based on the final predictor;

wherein the plurality of sub-templates includes a left sub-template, an above sub-template, an above right sub-template, a left below sub-template, and a left above sub-template.

21. A non-transitory computer-readable storage medium storing instructions that cause a processor to:

construct, during a conversion between a current video block of a video and a bitstream of the video, at least one template set for the current video block from a plurality of sub-templates;

derive multiple intra-prediction modes (IPMs) based on cost calculations;

determine, based on the multiple IPMs, a final predictor of the current video block; and perform the conversion based on the final predictor;

wherein the plurality of sub-templates includes a left sub-template, an above sub-template, an above right sub-template, a left below sub-template, and a left above sub-template.

22. A method of processing video data, comprising:

constructing, during a conversion between a current video block of a video and a bitstream of the video, at least one template set for the current video block from a plurality of sub-templates;

deriving at least one intra-prediction mode (IPM) based on cost calculations; and performing the conversion based on the at least one intra-prediction mode (IPM); constructing, a most probable mode (MPM) list for a subsequent video block after the current video block in the video, wherein one or more IPM of the at least one IPM is determined to be added into the MPM list of the subsequent video block.

23. The method of clause 22, wherein the one or more IPM is added directly into the MPM list in response to the one or more IPM being a conventional intra mode, wherein the conventional intra mode includes an angular mode, a DC mode, and a planar mode.

24. The method of clause 22, wherein the one or more IPM is converted to a conventional intra mode before being added into the MPM list in response to the one or more IPM being a non-conventional intra mode, wherein the conventional intra mode includes an angular mode, a DC mode, and a planar mode.

25. The method of clause 22, wherein the one or more IPM is replaced by a defined IPM before being added into the MPM list.

26. The method of clause 25, wherein the defined IPM is at least one of a planar mode, a DC mode, a horizontal mode, a vertical mode, a diagonal top-right mode, a diagonal bottom-left mode, or a diagonal top-left mode.

27. The method of clause 22, wherein one or more IPM of the at least one IPM is determined to be added into the MPM list of the subsequent video block based on a slice type of a slice corresponding to the current video block.

28. The method of clause 27, wherein determining, based on the slice type is a I slice, one or more IPM of the at least one IPM is determined to be added into the MPM list of the subsequent video block.

29. The method of clause 27, wherein determining, based on the slice type is a P slice or a B slice, one or more IPM of the at least one IPM is determined to be not added into the MPM list of the subsequent video block.

30. A method of processing video data, comprising:

constructing, during a conversion between a current video block of a video and a bitstream of the video, at least one template set for the current video block from a plurality of sub-templates;

deriving at least one intra-prediction mode (IPM) based on cost calculations; and constructing, a most probable mode (MPM) list for the current video block, wherein one or more IPM of the at least one IPM is determined to be inserted into the MPM list of the current video block; and performing the conversion based on the MPM list.

31. The method of clause 30, wherein the one or more IPM is inserted at the beginning of the MPM list.

32. The method of clause 31, further comprising increasing a size of the MPM list by one for the one or more IPM.

33. The method of clause 30, wherein the one or more IPM is inserted at the end of the MPM list.

0.34. The method of clause 33, further comprising increasing a size of the MPM list by one for the one or more IPM.

35. The method of clause 30, wherein the one or more IPM is used to replace at least one candidate in the MPM list.

36. The method of clause 30, wherein constructing the MPM list includes ordering the MPM list based on the one or more IPM.

37. The method of clause 30, wherein constructing the MPM list includes ordering the remaining IPMs which are not in MPM list based on the on the one or more IPM.

38. The method of clause 30, wherein the one or more IPM is added directly into the MPM list in response to the one or more IPM being a conventional intra mode, wherein the conventional intra mode includes an angular mode, a DC mode, and a planar mode.

39. The method of clause 30, wherein the one or more IPM is converted to a conventional intra mode before being added into the MPM list in response to the one or more IPM being a non-conventional intra mode, wherein the conventional intra mode includes an angular mode, a DC mode, and a planar mode.

40. An apparatus for processing video data comprising a processor and a non-transitory memory with instructions thereon, wherein the instructions upon execution by the processor, cause the processor to:

construct, during a conversion between a current video block of a video and a bitstream of the video, at least one template set for the current video block from a plurality of sub-templates;

derive at least one intra-prediction mode (IPM) based on cost calculations; and perform the conversion based on the at least one intra-prediction mode (IPM);

construct, a most probable mode (MPM) list for a subsequent video block after the current video block in the video, wherein one or more IPM of the at least one IPM is determined to be added into the MPM list of the subsequent video block.

41. A non-transitory computer-readable recording medium storing a bitstream of a video which is generated by a method performed by a video processing apparatus, wherein the method comprises:

constructing, during a conversion between a current video block of a video and a bitstream of the video, at least one template set for the current video block from a plurality of sub-templates;

deriving at least one intra-prediction mode (IPM) based on cost calculations; and performing the conversion based on the at least one intra-prediction mode (IPM);

constructing, a most probable mode (MPM) list for a subsequent video block after the current video block in the video, wherein one or more IPM of the at least one IPM is determined to be added into the MPM list of the subsequent video block;

generating the bitstream from the current block based on the MPM list.

42. A non-transitory computer-readable storage medium storing instructions that cause a processor to:

construct, during a conversion between a current video block of a video and a bitstream of the video, at least one template set for the current video block from a plurality of sub-templates;

derive at least one intra-prediction mode (IPM) based on cost calculations; and perform the conversion based on the at least one intra-prediction mode (IPM);

construct, a most probable mode (MPM) list for a subsequent video block after the current video block in the video, wherein one or more IPM of the at least one IPM is determined to be added into the MPM list of the subsequent video block.

43. An apparatus for processing video data comprising a processor and a non-transitory memory with instructions thereon, wherein the instructions upon execution by the processor, cause the processor to:

construct, during a conversion between a current video block of a video and a bitstream of the video, at least one template set for the current video block from a plurality of sub-templates;

derive at least one intra-prediction mode (IPM) based on cost calculations; and construct, a most probable mode (MPM) list for the current video block, wherein one or more IPM of the at least one IPM is determined to be inserted into the MPM of the current video block; and perform the conversion based on the MPM list.

44. A non-transitory computer-readable recording medium storing a bitstream of a video which is generated by a method performed by a video processing apparatus, wherein the method comprises:

constructing, during a conversion between a current video block of a video and a bitstream of the video, at least one template set for the current video block from a plurality of sub-templates;

deriving at least one intra-prediction mode (IPM) based on cost calculations; and constructing, a most probable mode (MPM) list for the current video block, wherein one or more IPM of the at least one IPM is determined to be inserted into the MPM of the current video block; and generating the bitstream from the current block based on the final predictor based on the MPM list.

45. A non-transitory computer-readable storage medium storing instructions that cause a processor to:

construct, during a conversion between a current video block of a video and a bitstream of the video, at least one template set for the current video block from a plurality of sub-templates;

derive at least one intra-prediction mode (IPM) based on cost calculations; and construct, a most probable mode (MPM) list for the current video block after the current video block in the video, wherein one or more IPM of the at least one IPM is determined to be inserted into the MPM list of the current video block; and perform the conversion based on the MPM list.

What is claimed is:

1. A method of processing video data, comprising:

constructing, during a conversion between a current video block of a video and a bitstream of the video, at least one template set for the current video block from a plurality of sub-templates;

deriving multiple intra-prediction modes (IPMs) based on cost calculations, wherein deriving the multiple IPMs includes deriving the at least two IPMs for the current video block based on determining that the at least two IPMs have a smallest cost of a set of possible IPMs for the current video block;

determining, based on the multiple IPMs, a final predictor of the current video block; and performing the conversion based on the final predictor;

wherein the plurality of sub-templates includes a left sub-template, an above sub-template, an above right sub-template, a left below sub-template, and a left above sub-template.

2. The method of claim 1, wherein deriving the multiple IPMs includes deriving at least one IPM for the current video block based on a first template set and deriving other IPMs for the current video block based on at least one template set different from the first template set.

3. The method of claim 1, wherein determining the final predictor includes determining one of the multiple IPMs as a final IPM to determine the final predictor.

4. The method of claim 3, wherein determining the final predictor further includes determining a syntax element related to the final IPM is present in the bitstream of the video, and wherein the syntax element is binarized with fixed length coding, or truncated unary coding, or unary coding, or EG coding, or coded as a flag.

5. The method of claim 4, wherein the syntax element is bypass coded or context coded.

6. The method of claim 4, wherein determining a syntax element related to the final IPM is present in the bitstream is further based on at least one of a block dimension of the current video block, block shape of the current video block, or a slice type corresponding to a slice of the current video block.

7. The method of claim 3, wherein determining the one of the multiple IPMs as the final IPM is based on at least one of a block dimension of the current video block, block shape of the current video block, or a slice type corresponding to a slice of the current video block.

8. The method of claim 7, wherein determining the one of the multiple IPMs as the final IPM includes determining a first one of the multiple IPMs when a width of the current video block is less than or equal to a height of the current video block or determining a second one of the multiple IPMs when the width of the current video block is greater than the height of the current video block.

9. The method of claim 1, wherein determining the final predictor includes selecting H IPMs from the multiple IPMs to generate H intermediate predictors, wherein H is greater than one.

10. The method of claim 9, wherein generating the final predictor further includes performing a weighted sum of the H intermediate predictors.

11. The method of claim 10, further comprising determining one or more weights for performing the weighted sum based on at least one of a block dimension of the current video block, block shape of the current video block, or numbers of a sub-template.

12. The method of claim 1, wherein generating the final predictor is based on at least one of the multiple IPMs or one or more default IPMs.

13. The method of claim 12, wherein the one or more default IPMs include at least one of a planar mode, a DC mode, a horizontal mode, a vertical mode, a diagonal top-right mode, a diagonal bottom-left mode, or a diagonal top-left mode.

14. The method of claim 12, further comprising determining a syntax element related to the one or more default IPMs is presented in the bitstream.

15. The method of claim 1, wherein the conversion includes decoding the current video block from the bitstream.

16. The method of claim 1, wherein the conversion includes encoding the current video block into the bitstream.

17. An apparatus for processing video data comprising a processor and a non-transitory memory with instructions thereon, wherein the instructions upon execution by the processor, cause the processor to:
  construct, during a conversion between a current video block of a video and a bitstream of the video, at least one template set for the current video block from a plurality of sub-templates;
  derive multiple intra-prediction modes (IPMs) based on cost calculations, wherein the at least two IPMs are derived for the current video block based on determining that the at least two IPMs have a smallest cost of a set of possible IPMs for the current video block;
  determine, based on the multiple IPMs, a final predictor of the current video block; and
  perform the conversion based on the final predictor;
  wherein the plurality of sub-templates includes a left sub-template, an above sub-template, an above right sub-template, a left below sub-template, and a left above sub-template.

18. A non-transitory computer-readable recording medium storing a bitstream of a video which is generated by a method performed by a video processing apparatus, wherein the method comprises:
  constructing, during a conversion between a current video block of a video and a bitstream of the video, at least one template set for the current video block from a plurality of sub-templates;
  deriving multiple intra-prediction modes (IPMs) based on cost calculations, wherein the at least two IPMs are derived for the current video block based on determining that the at least two IPMs have a smallest cost of a set of possible IPMs for the current video block;
  determining, based on the multiple IPMs, a final predictor of the current video block; and
  generating the bitstream from the current block based on the final predictor;
  wherein the plurality of sub-templates includes a left sub-template, an above sub-template, an above right sub-template, a left below sub-template, and a left above sub-template.

19. A non-transitory computer-readable storage medium storing instructions that cause a processor to:
  construct, during a conversion between a current video block of a video and a bitstream of the video, at least one template set for the current video block from a plurality of sub-templates;
  derive multiple intra-prediction modes (IPMs) based on cost calculations, wherein the at least two IPMs are derived for the current video block based on determining that the at least two IPMs have a smallest cost of a set of possible IPMs for the current video block;
  determine, based on the multiple IPMs, a final predictor of the current video block; and
  perform the conversion based on the final predictor;
  wherein the plurality of sub-templates includes a left sub-template, an above sub-template, an above right sub-template, a left below sub-template, and a left above sub-template.

* * * * *